(12) United States Patent
Prokhorov

(10) Patent No.: US 10,571,911 B2
(45) Date of Patent: Feb. 25, 2020

(54) MIXED AUTONOMOUS AND MANUAL CONTROL OF A VEHICLE

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 194 days.

(21) Appl. No.: 15/885,228

(22) Filed: Jan. 31, 2018

(65) Prior Publication Data

US 2018/0164808 A1    Jun. 14, 2018

Related U.S. Application Data

(63) Continuation-in-part of application No. 14/562,761, filed on Dec. 7, 2014.

(51) Int. Cl.
| | |
|---|---|
| *G05D 1/00* | (2006.01) |
| *B60W 10/06* | (2006.01) |
| *B60W 10/18* | (2012.01) |
| *B60W 10/20* | (2006.01) |
| *B60W 50/08* | (2012.01) |
| *B60W 50/12* | (2012.01) |
| *B60W 50/00* | (2006.01) |

(52) U.S. Cl.
CPC ........... *G05D 1/0061* (2013.01); *B60W 10/06* (2013.01); *B60W 10/18* (2013.01); *B60W 10/20* (2013.01);
(Continued)

(58) Field of Classification Search
CPC .... B60W 50/08; B60W 50/085; B60W 50/12; B60W 10/06; B60W 10/18; B60W 10/20;
(Continued)

(56) References Cited

U.S. PATENT DOCUMENTS

| 8,401,736 B2 * | 3/2013 | Kawamata | B60W 10/06 180/6.2 |
|---|---|---|---|
| 8,498,796 B2 | 7/2013 | Norris et al. | |

(Continued)

FOREIGN PATENT DOCUMENTS

| DE | 102007029909 A1 | 1/2009 |
|---|---|---|
| DE | 102012205343 A1 | 10/2012 |

(Continued)

*Primary Examiner* — Mussa A Shaawat
(74) *Attorney, Agent, or Firm* — Christopher G. Darrow; Darrow Mustafa PC

(57) ABSTRACT

In an operational mode of a vehicle, a vehicle system can be influenced by a mix of autonomous control inputs and manual control inputs. A first weight can be assigned to manual control inputs, and a second weight can be assigned to autonomous control inputs. While the vehicle is being operated primarily by manual inputs from a human driver, it can be determined whether the human driver of the vehicle has made a driving error and whether a current driving environment of the vehicle is a low complexity driving environment. Responsive to determining that the human driver of the vehicle has made the driving error and to determining that the current driving environment of the vehicle is a low complexity driving environment, the second weight assigned to autonomous control inputs can be automatically increased. Autonomous control inputs can influence the vehicle system in an amount corresponding to the second weight.

21 Claims, 8 Drawing Sheets

(52) U.S. Cl.
CPC .......... *B60W 50/085* (2013.01); *B60W 50/12* (2013.01); *B60W 2050/0022* (2013.01); *B60W 2540/10* (2013.01); *B60W 2540/12* (2013.01); *B60W 2540/18* (2013.01); *B60W 2710/0605* (2013.01); *B60W 2710/18* (2013.01); *B60W 2710/20* (2013.01); *G05D 2201/0213* (2013.01)

(58) Field of Classification Search
CPC ......... B60W 2710/20; B60W 2540/10; B60W 2540/12; B60W 2540/18; G05D 1/00; G05D 1/0061; G05D 2201/0213
See application file for complete search history.

(56) References Cited

U.S. PATENT DOCUMENTS

| | | | |
|---|---|---|---|
| 8,718,861 B1* | 5/2014 | Montemerlo | B60W 30/00 |
| | | | 701/26 |
| 2003/0163252 A1* | 8/2003 | Matsumoto | G01C 21/30 |
| | | | 701/412 |
| 2004/0029678 A1 | 2/2004 | Kayukawa et al. | |
| 2010/0299000 A1* | 11/2010 | Nakamura | B60R 1/00 |
| | | | 701/1 |
| 2012/0271500 A1 | 10/2012 | Tsimhoni et al. | |
| 2013/0002416 A1 | 1/2013 | Gazit | |
| 2014/0132082 A1 | 5/2014 | McGinn et al. | |
| 2015/0112571 A1* | 4/2015 | Schmudderich | B60W 30/08 |
| | | | 701/93 |

FOREIGN PATENT DOCUMENTS

| | | |
|---|---|---|
| DE | 102012002318 A1 | 8/2013 |
| DE | 102012223758 A1 | 3/2014 |
| DE | 102014107194 A1 | 11/2015 |
| DE | 102014220758 A1 | 4/2016 |
| JP | 2003035361 A | 2/2003 |
| JP | 2008013069 A | 1/2008 |
| JP | 2009262837 A | 11/2009 |
| JP | 2010000948 A | 1/2010 |
| JP | 2013233832 A | 11/2013 |
| WO | 2013099919 A1 | 7/2013 |

* cited by examiner

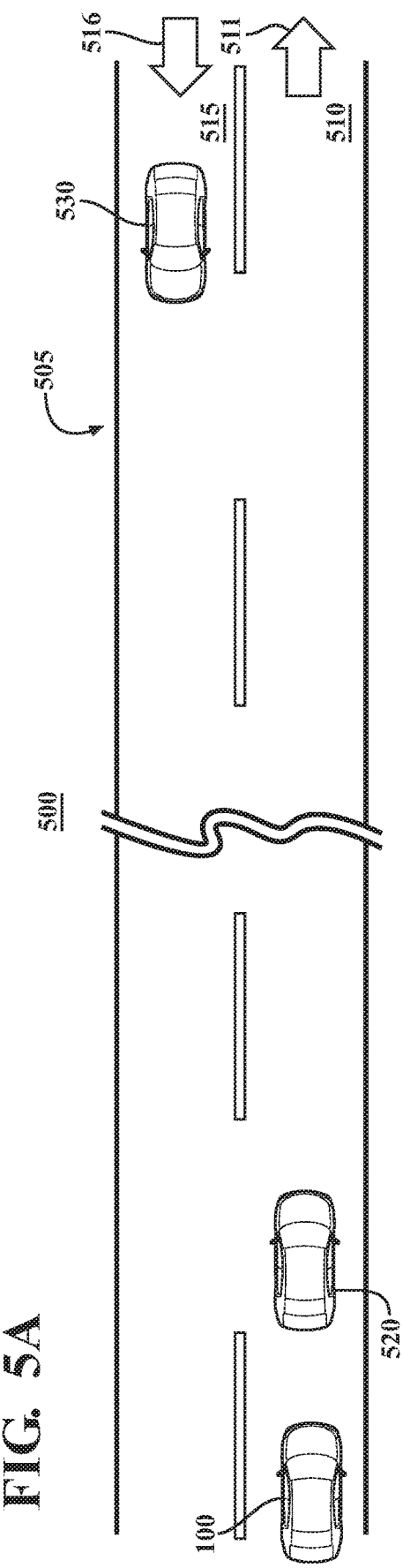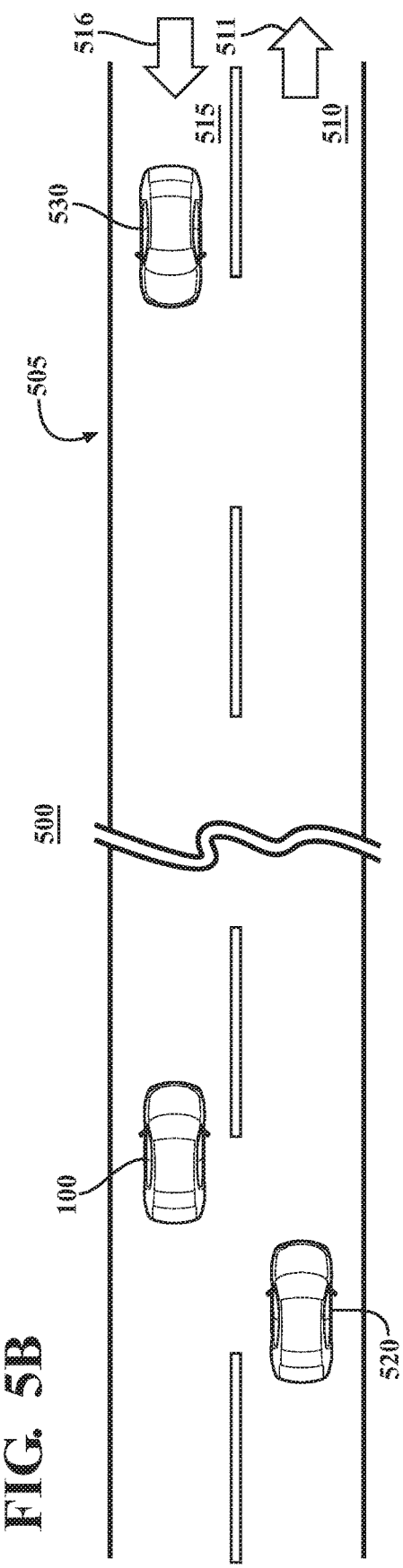

MIXED AUTONOMOUS AND MANUAL CONTROL OF A VEHICLE

CROSS REFERENCE TO RELATED APPLICATIONS

This application is a continuation-in-part of U.S. application Ser. No. 14/562,761, filed Dec. 7, 2014, which is incorporated herein by reference in its entirety.

FIELD

The subject matter described herein relates in general to vehicles and, more particularly, to vehicles that can be operated by a mix of autonomous control and manual control.

BACKGROUND

Autonomous vehicles or highly automated vehicles include an operational mode in which a computing system is used to navigate and/or maneuver the vehicle along a travel route with minimal or no input from a human driver. Autonomous vehicles may allow for a manual override of the autonomous operational mode. Manual override may occur if a received input from the vehicle driver exceeds a predetermined threshold input level.

Some vehicles permit a semi-autonomous mode of operation in which a portion of the vehicle controls are operated autonomously but the rest of the vehicle controls are operated manually by a driver. For instance, in an adaptive cruise control system, the speed of a vehicle is automatically adjusted to maintain a safe distance from a vehicle ahead based on data received from on-board sensors, but the vehicle is otherwise operated in a manual mode. Upon receiving a driver input to alter the speed of the vehicle (e.g. by depressing the brake pedal to reduce the speed of the vehicle), the adaptive cruise control system is deactivated and the speed of the vehicle is reduced.

SUMMARY

In one respect, the present disclosure is directed to a method of mixed autonomous and manual control of a vehicle. The vehicle includes an operational mode in which autonomous operation of a vehicle system (e.g. a braking system, a throttle system, a steering system, etc.) is influenced by a mix of autonomous control inputs and manual control inputs. The method includes assigning a first weight to manual control inputs and a second weight to autonomous control inputs. The method also includes applying the assigned first and second weights to the vehicle system. The method further includes, responsive to receiving a manual control input (e.g. from a driver of the vehicle), causing the autonomous operation of the vehicle to be influenced by the received manual control input in an amount corresponding to the first weight without deactivating the autonomous operation of the vehicle system.

In another respect, the present disclosure is directed to a system for mixed autonomous and manual control of a vehicle. The vehicle can include an operational mode in which an autonomous operation of the vehicle is influenced by a mix of autonomous control inputs and manual control inputs. The system includes a processor. The processor is programmed to initiate executable operations. The executable operations include assigning a first weight to manual control inputs and a second weight to autonomous control inputs. The executable operations also include applying the weighted manual control input and the weighted autonomous control input to the vehicle system. The executable operations further include, responsive to receiving a manual control input, causing the autonomous operation of the vehicle system to be influenced by the received manual control input in an amount corresponding to the first weight and without deactivating the autonomous operation of the vehicle system.

In yet another respect, the present disclosure is directed to a computer program product for mixed autonomous and manual control of a vehicle. The vehicle includes an operational mode in which an autonomous operation of the vehicle is influenced by a mix of autonomous control inputs and manual control inputs. The computer program product includes a computer readable storage medium having program code embodied therewith. The program code is executable by a processor to perform a method. The method can include assigning a first weight to manual control inputs and a second weight to autonomous control inputs. The method can also include applying the assigned first and second weights to a vehicle system. The method can further include, responsive to receiving a manual control input, causing the autonomous operation of the vehicle system to be influenced by the received manual control input in an amount corresponding to the first weight without deactivating the autonomous operation of the vehicle.

In one respect, the present disclosure is directed to a method of mixed autonomous and manual control of a vehicle. The vehicle can include an operational mode in which a vehicle system can be influenced by a mix of autonomous control inputs and manual control inputs. A first weight can be assigned to manual control inputs, and a second weight can be assigned to autonomous control inputs. The method can be performed while the vehicle is being operated primarily by manual inputs from a human driver. The method can include determining whether the human driver of the vehicle has made a driving error. The method can include determining whether a current driving environment of the vehicle is a low complexity driving environment. Responsive to determining that the human driver of the vehicle has made the driving error and to determining that the current driving environment of the vehicle is a low complexity driving environment, the method can include automatically increasing the second weight assigned to autonomous control inputs. The method can include, responsive to receiving an autonomous control input, causing the vehicle system to be influenced by the autonomous control input in an amount corresponding to the second weight.

In another respect, the present disclosure is directed to a system for mixed autonomous and manual control of a vehicle. The vehicle can include an operational mode in which a vehicle system can be influenced by a mix of autonomous control inputs and manual control inputs. A first weight can be assigned to manual control inputs, and a second weight can be assigned to autonomous control inputs. The vehicle can include one or more processors. The one or more processors can be programmed to initiate executable operations. While the vehicle is being operated primarily by manual inputs from a human driver, the executable operations can include determining whether the human driver of the vehicle has made a driving error. The executable operations can include determining whether the current driving environment is a low complexity driving environment. The executable operations can include, responsive to determining that the human driver of the vehicle has made the driving error and to determining that the current driving environment is a low complexity driving environment, automatically increasing the second weight assigned to autonomous control inputs. The executable operations can include, responsive to receiving an autonomous control input, causing the vehicle system to be influenced by an autonomous control input in an amount corresponding to the second weight.

In yet another respect, the present disclosure is directed to a computer program product for mixed autonomous and manual control of a vehicle. The vehicle can include an operational mode in which a vehicle system can be influenced by a mix of autonomous control inputs and manual control inputs. A first weight can be assigned to manual control inputs, and a second weight can be assigned to autonomous control inputs. The computer program product includes a non-transitory computer readable storage medium having program code embodied therewith. The program code is executable by a processor to perform a method while the vehicle is being operated primarily by manual inputs from a human driver. The method can include determining whether the human driver of the vehicle has made a driving error. The method can also include determining whether the current driving environment is a low complexity driving environment. The method can include, responsive to determining that the human driver of the vehicle has made the driving error and to determining that the current driving environment is a low complexity driving environment, automatically increasing the second weight assigned to autonomous control inputs. The method can include, responsive to receiving an autonomous control input, causing the vehicle system to be influenced by an autonomous control input in an amount corresponding to the second weight.

BRIEF DESCRIPTION OF THE DRAWINGS

FIG. 5A-5B present an example of a driving scenario in which the vehicle is overtaking another vehicle.

DETAILED DESCRIPTION

This detailed description relates to mixed autonomous control and manual control of a vehicle. One or more vehicle systems can be influenced by a mix of autonomous control inputs and manual control inputs. A first weight can be assigned to manual control inputs, and a second weight can be assigned to autonomous control inputs. If, while the vehicle is being operated primarily by manual inputs from a human driver, it is determined that the human driver of the vehicle has made a driving error and that the current driving environment of the vehicle is of sufficiently low complexity, the second weight assigned to autonomous control inputs can be automatically increased. Autonomous control inputs can influence the vehicle system in an amount corresponding to the second weight. The present detailed description relates to systems, methods and computer program products that incorporate one or more of such features. In at least some instances, such systems, methods and computer program products can improve safety and/or performance of a vehicle.

This detailed description also relates to mixed autonomous control and manual control of an autonomous vehicle. More particularly, such control can include weighting autonomous control inputs and manual control inputs. Such weighting can be made based on a classification of driving environment in which the autonomous vehicle is currently operating, a determined driver preference and/or some other criteria. The present detailed description relates to systems, methods and computer program products that incorporate one or more of such features. In at least some instances, such systems, methods and computer program products can improve safety and/or performance of an autonomous vehicle.

Figure 2:
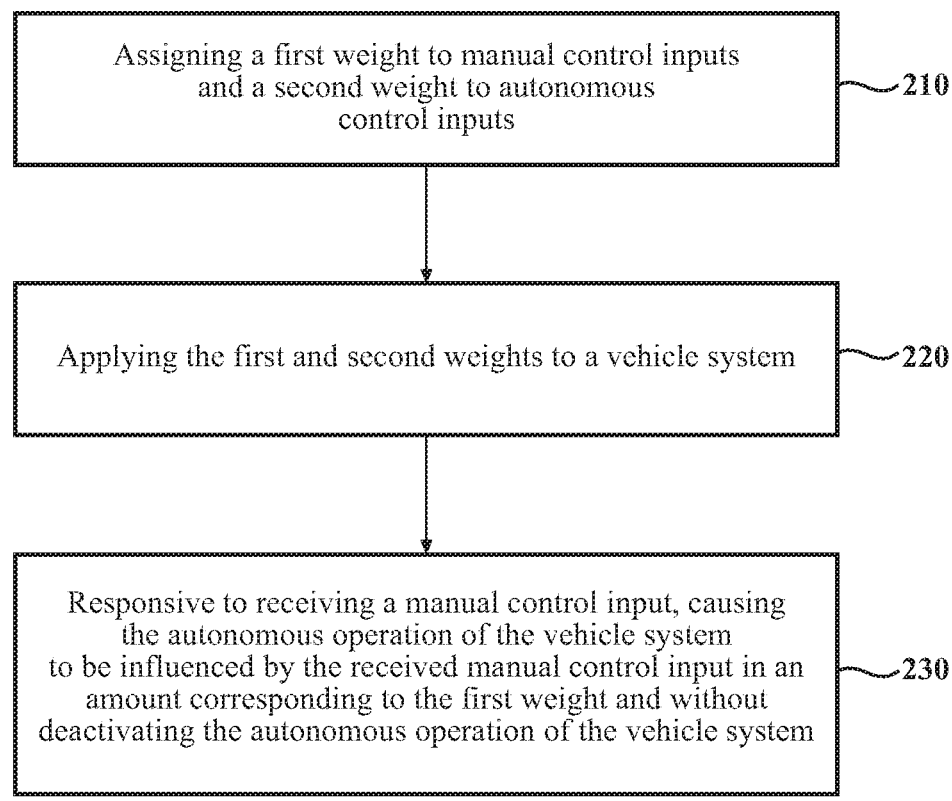
FIG. 2 is an example of a method of mixed autonomous and manual control of a vehicle.
Figure 3:
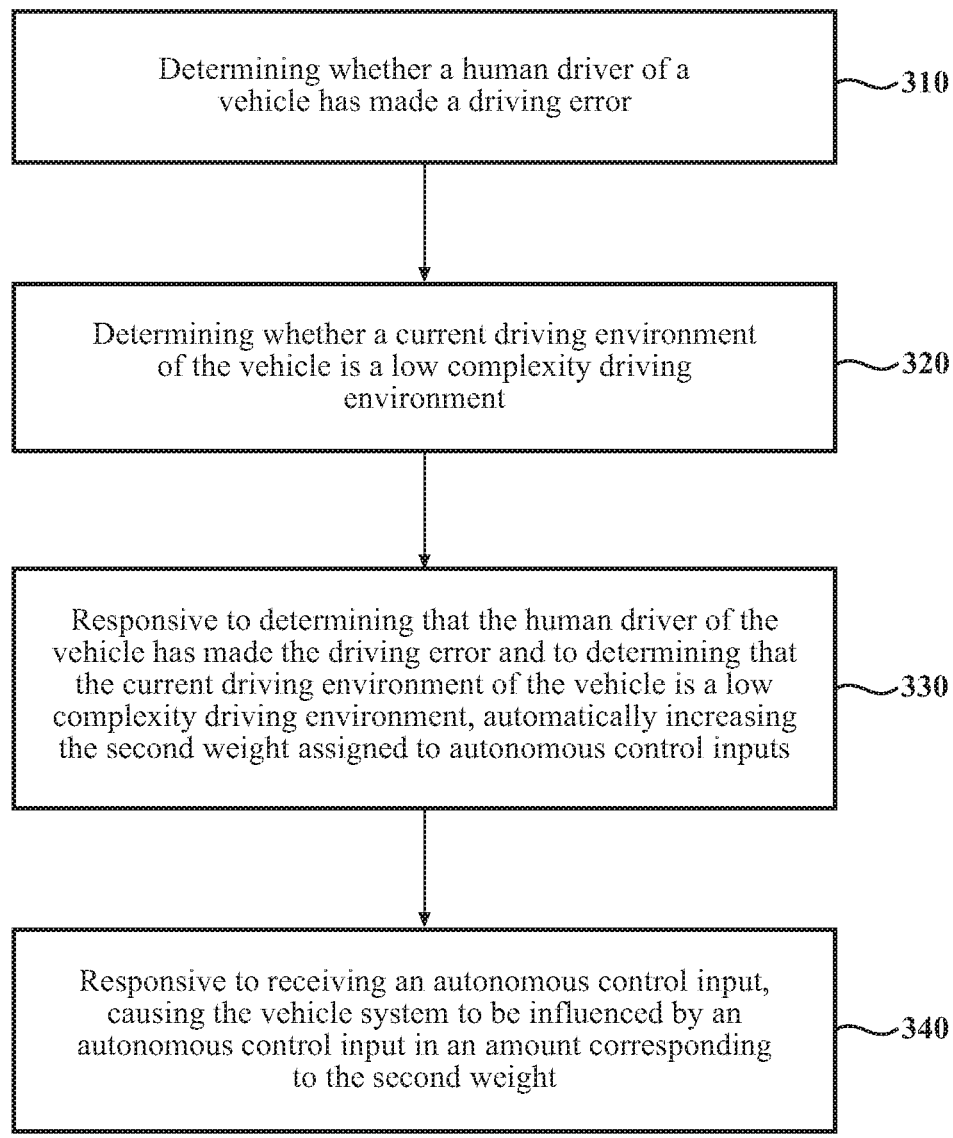
FIG. 3 is an example of another method of mixed autonomous and manual control of a vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
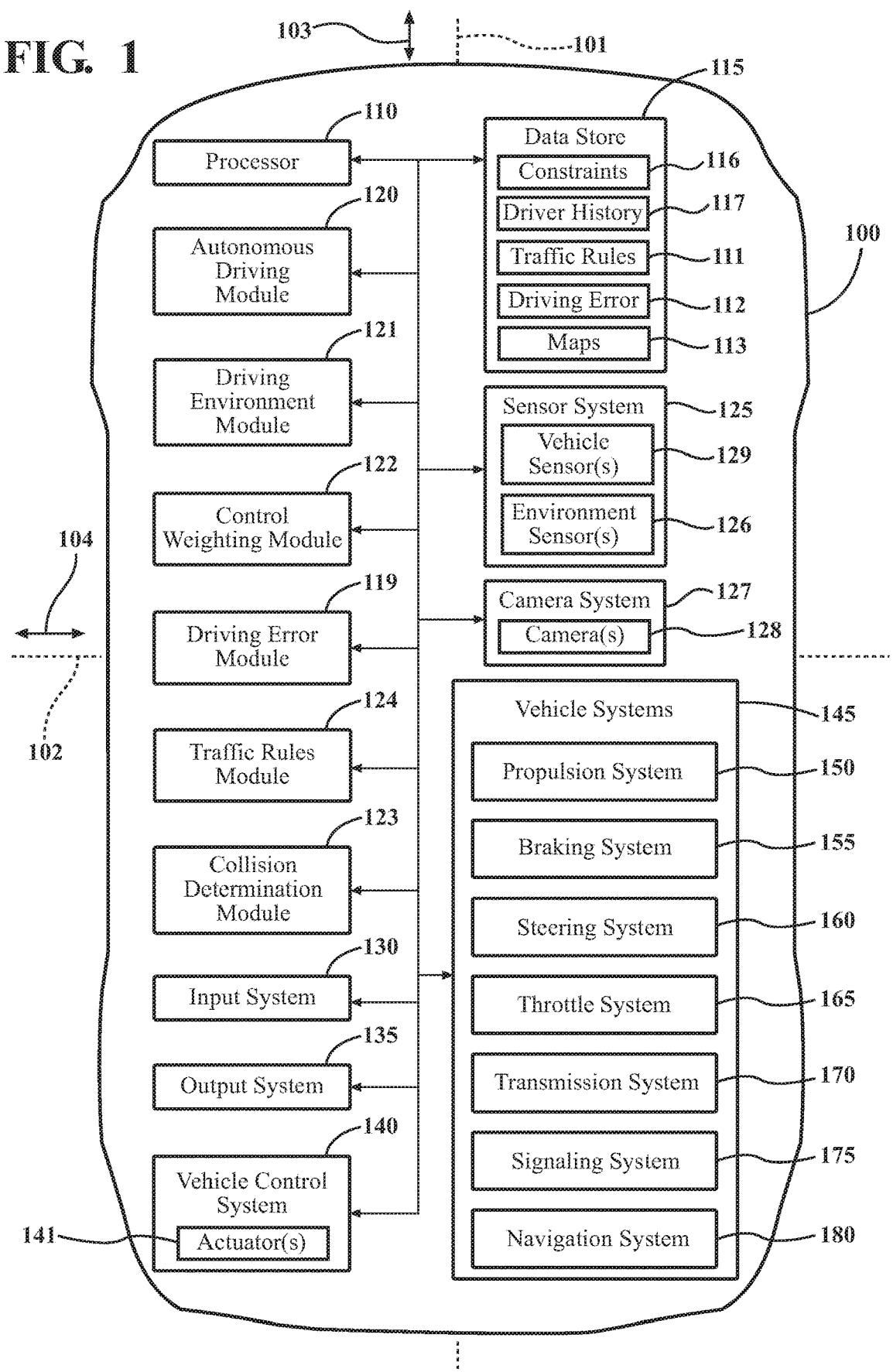
FIG. 1 is an example of a vehicle configured for mixed autonomous and manual control.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated or completely automated. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. Examples of a semi-autonomous operational mode is when an adaptive cruise control and/or lane keeping is activated. The vehicle 100 can have a manual mode. "Manual mode" means that a majority or all of the navigation and/or maneuvering of the vehicle along a travel route is performed by a human driver. In some instances, the vehicle 100 can be configured to be selectively switched between two or more operational modes, including any of those described herein. Such switching can be implemented in any suitable manner, now known or later developed.

The vehicle 100 can be configured to operate in a shared operational mode. "Shared operational mode" means that a vehicle and/or one or more vehicle systems operates in an autonomous mode that is influenced is response to receiving manual control inputs without deactivating the autonomous operation of the vehicle. "Without deactivating the autonomous operation of the vehicle" means that the autonomous mode is not completely disabled, deactivated or turned off and/or it means that the autonomous mode is maintained but at a lesser degree but under a lesser degree of influence from received autonomous control inputs. The shared operational mode can be implemented as a subset of the autonomous mode, or it can be implemented as a separate operational mode. As will be described herein, the vehicle 100 can be operated according to a weighted mix of manual control inputs and autonomous control inputs. Weights can be assigned to the manual controls and the autonomous controls based on one or more criteria. For instance, weights can be assigned to the manual controls and the autonomous controls based on the type of driving environment in which the vehicle 100 is currently operating and/or based on preferences of a driver of the vehicle 100.

The vehicle 100 can have an associated longitudinal axis 101, which can be the central axis of the vehicle 100. The vehicle 100 can have an associated longitudinal direction 103. "Longitudinal direction" means any direction that is substantially parallel to and/or co-linear with the longitudinal axis 101. The vehicle 100 can have an associated lateral axis 102, which can be substantially perpendicular to the longitudinal axis. As used herein, the term "substantially" includes exactly the term it modifies and slight variations therefrom. Thus, the term "substantially perpendicular" means exactly perpendicular and slight variations therefrom (e.g. within normal manufacturing tolerances, within about 10 degrees or less, within about 5 degrees or less, within about 3 degrees or less, etc.). The vehicle 100 can have an associated lateral direction 104. "Lateral direction" means any direction that is substantially parallel to and/or co-linear with the lateral axis 102.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

In one or more arrangements, the one or more data stores 115 can include traffic rules data 111. As used herein, "traffic rule" is any law, rule, ordinance or authority that governs the operation of a motor vehicle, including motor vehicles in motion and motor vehicles that are parked or otherwise not in motion. The traffic rules data 111 can include data on instances, situations, and/or scenarios in which a motor vehicle is required to stop or reduce speed. The traffic rules data 111 can include speed limit data. The traffic rules can be international, federal, national, state, city, township and/or local laws, rules, ordinances and/or authorities. The traffic rules data 111 can include data on traffic signals and traffic signs.

In one or more arrangements, the data store(s) 115 can include one or more driving error libraries 112. The one or more driving error libraries 112 can include one or more examples of driving errors by a human driver. In some instances, the driving errors can be those made in low complexity driving environments. The driving errors can be defined in any suitable manner. As an example, the driving error can be a human driver's delay, hesitation, and/or failure to act in certain scenarios (e.g., when entering an intersection, when entering a roundabout, with respect to an impending collision, etc.). As another example, the driving error can be a human driver's actions that are overly aggressive or violate a traffic rule to as to substantially increase the risk of collision (e.g., entering a one way street from the wrong direction).

In one or more arrangements, the one or more data stores 115 can include map data 113. The map data 113 can include maps of one or more geographic areas. In some instances, the map data 113 can include information or data on roads, traffic control devices, road markings, structures, features, and/or landmarks in the one or more geographic areas. The map data 113 can be in any suitable form. In some instances, the map data 113 can include aerial views of an area. In some instances, the map data 113 can include ground views of an area, including 360 degree ground views. The map data 113 can include measurements, dimensions, distances, and/or information for one or more items included in the map data 113 and/or relative to other items included in the map data 113. The map data 113 can include a digital map with information about road geometry. In one or more arrangement, the map data 113 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 113 can be high quality and/or highly detailed.

The vehicle 100 can include an autonomous driving module 120. The autonomous driving module 120 can be implemented as computer readable program code that, when executed by a processor, implement the various processes described herein. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Alternatively or in addition, the data store 115 may contain such instructions. Such instructions can include instructions to execute various vehicle functions and/or to transmit data to, receive data from, interact with, and/or control the vehicle 100 or one or more systems thereof (e.g. one or more of vehicle systems 145). The autonomous driving module 120 can also include instructions to navigate and/or maneuver the vehicle 100. For instance, the autonomous driving module 120 can be operatively connected to send commands, directives and/or instructions directly on one or more of the vehicle systems 145 and/or indirectly through one or more vehicle control systems 140.

The vehicle 100 can include a driving environment module 121. The driving environment module 121 can be implemented as computer readable program code that, when executed by a processor, implement the various processes described herein. The driving environment module 121 can be a component of the processor 110, or the driving environment module 121 can be executed on and/or distributed among other processing systems to which the processor 110 is operatively connected.

The driving environment module 121 can be configured to identify, classify and/or assess the driving environment of the vehicle 100. "Driving environment" means at least a portion of the external environment surrounding the vehicle. The driving environment can be located within a predetermined distance from the vehicle 100. In one or more arrangements, the predetermined distance can be established by the sensing range of one or more sensors of a sensor system 125 of the vehicle 100. The driving environment can include any information about the external environment, including, for example, the presence and/or location of one or more objects in the environment, the identity and/or nature of the objects, traffic conditions and/or weather conditions. Such information about the driving environment can be obtained from the sensor system 125 and/or from any other suitable source (e.g. websites, databases, etc.).

The driving environment can be classified in various ways and/or by various methods, such as by machine learning and/or computational intelligence methods (e.g. fuzzy logic, neural networks and/or the like), just to name a few possibilities. In one or more arrangements, the driving environment can be classified based on the complexity of the driving environment. The complexity of the driving environment can be defined in any suitable manner. For example, in one or more arrangements, the classifications of the driving environment can include a low complexity environment and a high complexity environment. While arrangements will be described herein with respect to low complexity and high complexity environments, it will be understood that these classifications are provided merely as examples. Indeed, there can be additional types of classifications (e.g. one or more medium complexity environments). Further, there can be entirely different types of classifications for the driving environment.

The complexity of a driving environment can be classified based on one or more suitable factors. For instance, the driving environment can be classified as low complexity if a relatively small number of objects is detected in the driving environment, a relatively low density of objects is detected in the driving environment, the objects detected in the driving environment are detected as moving in a relatively small number of different directions, a relatively small number of different types of objects is detected in the driving environment, a relatively small amount of occlusions of individual objects in the driving environment is detected, and/or a high degree of agreement in data captured by the sensor system is attained.

Further, the driving environment can be classified as a high complexity if a relatively large number of objects is detected in the driving environment, a relatively high density of objects is detected in the driving environment, the objects detected in the driving environment are detected as moving in a relatively large number of different directions, a relatively large number of different types of objects is detected in the driving environment, a relatively large amount of occlusions of individual objects in the driving environment is detected, and/or a low degree of agreement in data captured by the sensor system of the vehicle is attained. Each of these various potential factors will be addressed in turn below.

With respect to the number of objects in the driving environment, a detected quantity objects in the driving environment can be compared to a predetermined quantity of objects. For instance, the predetermined quantity of objects can be 10 or fewer, 5 or fewer, or 3 or fewer, just to name a few possibilities. Thus, if the quantity of detected objects is at or below the predetermined quantity of objects, the driving environment can be considered to be low complexity. If the quantity of detected objects is above the predetermined quantity of objects, the driving environment can be classified as a high complexity environment or some other non-low complexity classification. As an example, if no objects (e.g. vehicles) are detected in the driving environment, then, in one or more arrangements, the driving environment can be classified as a low complexity environment.

With respect to the density of objects in the driving environment, a detected density (e.g. a quantity of objects located in a given area) can be compared to a predetermined density (e.g. a predetermined quantity of objects for a given area). If the detected density is less than or equal to the predetermined density, then the driving environment can be classified as a low complexity environment. If the detected density is greater than the predetermined density, the driving environment can be classified as a high complexity environment or some other non-low complexity classification.

Further, the complexity of the driving environment can be classified with respect to the number of different directions in which detected objects are moving. The direction of movement of detected objects in the driving environment can be detected by one or more sensors of the sensor system 125. The total number of different directions of movement of such objects can be determined. The total number of different directions of movement can be compared to a predetermined number of directions of movement. If the detected number of different directions of movement is less than or equal to the predetermined number of directions of movement, the driving environment can be classified as a low complexity environment. If the quantity of detected objects is above the predetermined quantity of objects, the driving environment can be classified as a high complexity environment or some other non-low complexity classification. The predetermined number of directions can be any suitable value, such as 5 or less, 4 or less, 3 or less, 2 or less, or 1.

The complexity of the driving environment can be classified with respect to the number of different types of objects in the driving environment. For instance, the vehicle 100 can be configured to determine the general type of one or more objects detected in the driving environment. For instance, the vehicle 100 can determine whether a detected object is a vehicle, a pedestrian, a bicyclist, a motorcyclist, just to name a few possibilities. Once the general type of the detected objects is determined, the total number of different types of objects can be determined. The total number of different types of objects can be compared to a predetermined number of different types of objects. If the detected number of different types of objects is less than or equal to the predetermined number of different types of objects, the driving environment can be classified as a low complexity environment. If the determined number of different types of objects is greater than the predetermined number of different types of objects, the driving environment can be classified as a high complexity environment or some other non-low complexity classification. The predetermined number of different types of objects can be any suitable value, such as 3 or less, 2 or less, or 1.

The complexity of the driving environment can be classified with respect to the number of occlusions of individual objects in the driving environment. Generally, as the number of occlusions decreases, the ease of interpretation and assessment of data from the sensor system 125 of the vehicle 100 increases. A detected number of occlusions can be compared to a predetermined number of occlusions. For instance, the predetermined number of occlusions can be 5 or fewer, 4 or fewer, or 3 or fewer, 2 or fewer or 1, just to name a few possibilities. Thus, if the detected number of occlusions is less than or equal to the predetermined number of occlusions, the driving environment can be classified as a low complexity environment. If the detected number of occlusions is greater than the predetermined number of occlusions, the driving environment can be classified as a high complexity environment or some other non-low complexity classification.

The complexity of the driving environment can be classified with respect to the degree of agreement in data acquired by the sensor system 125. If data acquired by the sensor system 125 is identical or matches within a predetermined probability (e.g., about 85% or greater, about 90% or greater, about 95% or greater, etc.) or confidence level, the driving environment can be classified as being a low complexity environment. However, if data acquired by the sensor system 125 is not identical or does not match within a predetermined probability or confidence level, then the driving environment can be classified as being a high complexity environment.

Of course, it will be understood that the classification of the driving environment can be made with respect to any combination of the above factors. Further, the classification of the driving environment can be made with respect to any combination of one or more of the above factors with one or more others factors not listed above. Still further, the classification of the driving environment can be made with respect to any one or more other factors not listed above. As an example, in one or more arrangements, the number of detected objects and the number of directions in which such detected objects are moving can be used together to classify the driving environment. For instance, if there are 15 detected objects and all of the detected objects are determined to be moving in substantially the same direction, then the environment may be classified as a low complexity environment. In contrast, if there are 15 detected objects and the detected objects are moving in a total of 7 different directions, then the driving environment may be classified as a high complexity environment.

The vehicle 100 can include a control weighting module 122. The control weighting module 122 can be implemented as computer readable program code that, when executed by a processor, implement the various processes described herein. The control weighting module 122 can be a component of the processor 110, or the control weighting module 122 can be executed on and/or distributed among other processing systems to which the processor 110 is operatively connected.

The control weighting module 122 can determine and/or assign weights to inputs to a vehicle control system 140 of the vehicle 100. The vehicle control system 140 can be configured to receive manual control inputs and autonomous control inputs. Accordingly, the control weighting module 122 can determine and/or assign a first weight to manual control inputs and a second weight to autonomous control inputs. The control weighting module 122 can determine and/or assign weights in any suitable manner.

In one or more arrangements, the control weighting module 122 can determine and/or assign weights based on the classification of the driving environment, as determined by the driving environment module 121. If the driving environment is classified as being a low complexity environment, autonomous control inputs can be more heavily weighted than manual control inputs. Thus, the second weight assigned to autonomous control inputs can be greater than the first weight assigned to manual control inputs. As a result, manual control inputs (e.g. actions by the driver) will have a slight influence on and/or will cause relatively slight deviations from the autonomous operation of the vehicle 100 or the current route of the vehicle 100.

For instance, when the driving environment is classified as being a low complexity environment, the second weight assigned to autonomous control inputs can be 0.6, 0.65, 0.7, 0.75, 0.8, 0.85, 0.9 or 0.95, and the first weight assigned to manual control inputs can be 0.4, 0.35, 0.3, 0.25, 0.2, 0.15, 0.1 or 0.05, respectively. These weights are provided merely as examples, and it will be understood that arrangements are not limited to these weights and that other weights may be used.

If the driving environment is classified as being a high complexity environment, manual control inputs can be more heavily weighted than autonomous control inputs. In such case, the control weighting module 122 can assign a different second weight to autonomous control inputs and a different first weight to manual control inputs compared to when the driving environment is classified as being a low complexity environment. Thus, the first weight assigned to manual control inputs can be greater than the second weight assigned to autonomous control inputs. In one or more arrangements, the first weight assigned to manual control inputs can be less than the second weight assigned to autonomous control inputs, but manual control inputs can account for a greater percentage of the overall control when compared to when the driving environment is classified as being a low complexity environment. As a result, manual control inputs (e.g. actions by the driver) will have greater influence on and/or will cause greater deviations from the autonomous operation of the vehicle 100 or the current route of the vehicle 100.

In one or more arrangements, the control weighting module 122 can determine and/or assign weights based on driver preferences. The driver preferences can be based on driver history data 117. The driver history data 117 can be stored in data store 115 or in any other suitable location that can be accessed by and/or operatively connected to the control weighting module 122 and/or the processor 110. For instance, if a large number of manual control inputs are received from a driver during certain driving conditions (e.g. rain, snow, fog, tortuous paths, congested highways, etc.) or on certain roads, portions of a road, or areas, then the control weighting module 122 may learn from the driver's past actions in these circumstances. Thus, when a condition historically associated with an increased amount of manual control inputs or specific types of manual control inputs, the control weighting module 122 may automatically increase the first weight assigned to manual control inputs. Again, in such case, the first weight assigned to manual control inputs may or may not be greater than the second weight assigned to autonomous control inputs.

In one or more arrangements, the control weighting module 122 can determine and/or assign weights based on inputs received from one or more other modules. Various examples of such other modules are described herein.

In one or more arrangements, the vehicle 100 can include a collision determination module 123. The collision determination module 123 can be implemented as computer readable program code that, when executed by a processor, implements one or more of the various processes described herein, including, for example, to determine or predict whether a dynamic object detected in the driving environment will collide with the vehicle 100. The collision determination module 123 can be a component of the processor 110, or the collision determination module 123 can be executed on and/or distributed among other processing systems to which the processor 110 is operatively connected. The collision determination module 123 can include instructions (e.g., program logic) executable by the processor 110. Alternatively or in addition, the data store 115 may contain such instructions.

The collision determination module 123 can be configured to determine or predict whether the vehicle will collide with an object detected in the driving environment. Various factors can be used in the determination, including, for example, one or more of the following: speed of the vehicle 100, the current location of the vehicle, the current location of object(s) in the driving environment, the location of the object(s) relative to the vehicle 100, past movement(s) of the object(s), predicted future movements of the object(s), and/or speed of the object(s).

The collision determination module 123 can be configured to determine or predict whether a collision between an object and the vehicle is avoidable or unavoidable. Such a determination may consider one or more factors, including, for example, one or more of the following: the location of other objects in the driving environment, road conditions, road markings, traffic rules, etc.

The vehicle 100 can include a traffic rules module 124. The traffic rules module 124 can be implemented as computer readable program code that, when executed by a processor, implement the various processes described herein. For instance, the traffic rules module 124 can be configured to determine whether a detected turning object is moving in compliance with one or more traffic rules. Alternatively or in addition, the traffic rules module 124 can be configured to determine whether the vehicle 100 is operating in compliance with one or more traffic rules. Alternatively or in addition, the traffic rules module 124 can be configured to determine whether at least a portion of a current travel route of the vehicle 100 and/or a driving maneuver would violate one or more traffic rules. The traffic rules module 124 can be a component of the processor 110. Alternatively or in addition, the traffic rules module 124 can be executed on and/or distributed among other processing systems to which the processor 110 is operatively connected. In one or more arrangements, the traffic rules module 124 can be operatively connected to one or more data stores 115 with traffic rules data 111.

The vehicle 100 can include a driving error module 119. The driving error module 119 can be implemented as computer readable program code that, when executed by a processor, implement the various processes described herein. The driving error module 119 can be a component of the processor 110, or the driving error module 119 can be executed on and/or distributed among other processing systems to which the processor 110 is operatively connected.

The driving error module 119 can be configured to determine whether a human driver of the vehicle 100 has committed a driving error. In one or more arrangements, the driving error module 119 can be operable when the vehicle is operating in a manual mode. In one or more arrangements, the driving error module 119 can be configured to operate when the vehicle 100 is operating in a shared operational mode. For example, the driving error module 119 can be configured to operate when manual control inputs are greater than autonomous control inputs, overall or with respect to one or more individual vehicle systems 145. In one or more arrangements, the driving error module 119 can be operable at all times while the vehicle is in operation.

The driving error module 119 can be configured to determine whether a human driver of the vehicle 100 has committed a driving error in any suitable manner. For instance, the driving error module 119 can be configured to receive data from the sensor system 125, including driving environment data and/or vehicle data. The driving error module 119 can be configured to compare the sensor system data and/or other data to the one or more driving error libraries 112.

The driving error module 119 can compare the sensor system data and/or other data to the library of driving errors 112 at any suitable time. For instance, driving error module 119 can compare the sensor system data and/or other data to the one or more driving error libraries 112 continuously, periodically, irregularly, or even randomly. If the sensor system data and/or other data matches one or more errors in the one or more driving error libraries 112, the driving error module 119 can determine that a driving error has occurred. "Match" or "matches" means an exact match or within a predetermined probability (e.g., at least about 80% or greater, at least about 85% or greater, at least about 90% or greater, at least about 95% or greater, etc.), a predetermined confidence level, and/or a predetermined threshold or parameter.

In some instances, the driving error module 119 can determine that there is a driving error if the risk of collision with an object in the driving environment (e.g., vehicle, pedestrian, etc.) is at or above a predetermined probability, a predetermined confidence level, and/or a predetermined threshold.

The vehicle 100 can include a vehicle control system 140. The vehicle control system 140 can be configured to modify, adjust and/or alter one or more of the vehicle systems 145 or components thereof responsive to receiving control inputs (e.g. signals or other inputs). The control inputs can include manual control inputs and autonomous control inputs. "Manual control inputs" are inputs received from actions of a human driver and/or other human occupant of the vehicle 100. Examples of manual control inputs include turning a steering wheel, applying pressure to a brake pedal, and applying pressure to a gas pedal, just to name a few possibilities. "Autonomous control inputs" are inputs received from the processor 110 and/or the autonomous driving module 120.

The vehicle control system 140 can include one or more actuators 141. The actuators 141 can be any element or combination of elements operable to modify, adjust and/or alter one or more of the vehicle systems 145 or components thereof to responsive to receiving control inputs. Any suitable type of actuator can be used. For instance, the one or more actuators 141 can include motors, pneumatic actuators, hydraulic pistons, relays, solenoids, and/or piezoelectric actuators, just to name a few possibilities.

The vehicle control system 140 can have one or more associated control directions. For instance, the vehicle control system 140 can have an associated longitudinal control direction and a lateral control direction. The longitudinal control direction can apply to one or more of the vehicle systems 145 that affects movement and/or maneuvering of the vehicle 100 in the longitudinal direction 103 of the vehicle 100. Examples of such vehicle systems include the braking system 155 and the throttle system 165. The lateral control direction can apply to one or more of the vehicle systems 145 that affects movement and/or maneuvering of the vehicle 100 in the lateral direction 104 of the vehicle 100. One example of such a vehicle system 145 is the steering system 160.

The control weighting module 122 can be configured to apply the weighted manual and autonomous control inputs to all vehicle systems 145 or any subset thereof. Further, the control weighting module 122 can be configured to apply the weighted manual and autonomous control inputs to one or more vehicle systems 455 associated with a particular control direction. For instance, the control weighting module 122 can apply the weighted manual and autonomous control inputs to one or more of the vehicle systems 145 in the longitudinal direction. Alternatively or in addition, the control weighting module 122 can apply the weighted manual and autonomous control inputs to one or more of the vehicle systems 145 in the lateral direction.

The control weighting module 122 can determine and/or assign weights at any suitable time. For instance, the control weighting module 122 can determine and/or assign weights continuously during the autonomous operation and/or shared operational mode of the vehicle 100. Alternatively, the control weighting module 122 can determine and/or assign weights at any suitable interval during the autonomous operation and/or shared operational mode of the vehicle 100. Alternatively, the control weighting module 122 can determine and/or assign weights when a manual control input is received.

As noted above, in the shared operational mode, the vehicle 100 operates in an autonomous mode that is influenced is response to receiving manual control inputs without deactivating the autonomous operation of the vehicle. Thus, when a control input is received, the vehicle control system 140 can treat the input in accordance with the weight currently associated with manual control inputs and/or autonomous control inputs. For example, responsive to receiving a manual control input from a driver of the vehicle (e.g. turning the steering wheel), the manual control input can be adjusted in an amount corresponding to the first weight assigned to manual control inputs. Thus, the vehicle control system 140 can cause the autonomous operation of the vehicle 100 to be influenced by the received manual control input in an amount corresponding to the first weight assigned to manual control inputs without deactivating the autonomous operation of the vehicle 100.

According to arrangements described herein, received manual control inputs generally will not completely override the autonomous operation or route of the vehicle 100. Rather, manual control inputs will only influence the autonomous operation or route of the vehicle 100. However, in one or more arrangements, a complete override of the autonomous operation or route of the vehicle 100 may be permitted in certain circumstances. For instance, if an extreme manual control input is received, then a complete manual override may be permitted. Examples of possible extreme manual control inputs include a driver sharply depresses the brake pedal or makes a very sharp turn of the steering wheel. In instances of extreme manual control inputs, autonomous control inputs can be ignored or otherwise filtered and thus effectively ignored. Alternatively, autonomous control inputs can be assigned a weight of zero.

It should be noted that a manual control input received from the driver of the vehicle 100 can be validated to ensure that it does not violate vehicle design constraints (e.g. vehicle stability constraints). To that end, the data store 115 can include one or more vehicle design constraints 116. Thus, received manual control inputs can be compared to the one or more vehicle design constraints 116. If a manual control input, as received from the driver and/or as weighted by the first weight associated with manual control inputs, is determined to be in violation of one or more vehicle design constraints 116, the manual control input can be ignored or otherwise filtered and thus effectively ignored. In one or more arrangements, an autonomous control input from the processor 110, the autonomous driving module 120 and/or from any other system source can be validated to ensure that it does not violate one or more vehicle design constraints 116.

As noted above, the vehicle 100 can include sensor system 125. The sensor system 125 can include one or more sensors. "Sensor" means any device, component and/or system that can detect, determine, assess, measure, quantify and/or sense something. The one or more sensors can be configured to detect, determine, assess, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other or one or more of the sensors can work in combination with each other. The sensor system 125 and/or the one or more sensors can be operatively connected to the processor 110, the data store 115, the autonomous driving module 120, the driving environment module 121, the control weighting module 122 and/or other element of the vehicle 100.

The sensor system 125 can include any suitable type of sensor. For example, the sensor system 125 can include one or more vehicle sensors 129, which can be configured to acquire, detect, determine, assess, monitor, measure, quantify and/or sense information about the vehicle 100 (e.g., position, location, heading, orientation, speed, acceleration, deceleration, accelerator pedal position, brake pedal position, etc.). Alternatively or in addition, the sensor system 125 can include one or more sensors configured to detect, determine, assess, measure, quantify and/or sense information about an environment in which the vehicle 100 is located, including information about objects in the environment. Such objects may be stationary object or moving objects. Alternatively or in addition to one or more of the above examples, the sensor system 125 can include one or more sensors configured to detect, determine, assess, measure, quantify and/or sense the location of the vehicle 100. Various examples of these and other types of sensors will be described herein. It will be understood that the embodiments are not limited to the particular sensors described.

The sensor system 125 can include one or more sensors configured to detect, determine, assess, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more environment sensors 126. The environment sensors 126 can be configured to acquire, detect, determine, assess, monitor, measure, quantify and/or sense about the external environment in which a vehicle is located or one or more portions thereof. For example, such data or information can be related to objects in at least a portion of the environment surrounding the vehicle 100. Further, such data or information can be related to other things in the external environment of the vehicle 100, such as, for example, lane markers, signs, traffic lights, traffic signs, lane lines, crosswalks, curbs proximate the vehicle 100, off-road objects, etc. In one or more arrangements, the sensor system 125 can include one or more radar sensors, one or more LIDAR sensors, one or more sonar sensors, one or more cameras, and/or one or more ranging sensors. Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, measure, quantify and/or sense, directly or indirectly, the presence of one or more objects in the surrounding environment of the vehicle 100, the position of each detected object relative to the vehicle 100, the distance between each detected object and the vehicle 100 in one or more directions (e.g. in the longitudinal direction 103, a lateral direction 104 and/or other direction(s)), the speed of each detected object, and/or the direction in which each detected object is moving.

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, measure, quantify and/or sense, directly or indirectly, the presence of one or more objects in the surrounding environment of the vehicle 100, the position of each detected object relative to the vehicle 100 and/or the distance between each detected object and the vehicle 100 in one or more directions (e.g. in the longitudinal direction 103, a lateral direction 104 and/or other direction(s)), the speed of each detected object, and/or the direction in which each detected object is moving.

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, measure, quantify and/or sense, directly or indirectly, the presence of one or more objects in the surrounding environment of the vehicle 100, the position of each detected object relative to the vehicle 100 and/or the distance between each detected object and the vehicle 100 in one or more directions (e.g. in the longitudinal direction 103, a lateral direction 104 and/or other direction(s)), and/or the direction in which each detected object is moving. Such detecting can be based on a characteristic (e.g. the intensity) of a reflected ultrasonic signal.

In some arrangements, the sensor system 125, the processor 105, and/or one or more of the modules 120, 121, 122 can be configured to detect, determine, assess, measure, quantify and/or sense, directly or indirectly, one or more aspects, characteristics and/or properties of a detected object. For example, the sensor system 125, the processor 105, and/or one or more of the modules 120, 121, 122 can be configured to detect, determine, assess, measure, quantify and/or sense, directly or indirectly, the size, relative size, length, width, height, a dimension, the material and/or a material property of a detected object.

Alternatively or in addition to any of the sensors described above, the sensor system 125 can include other types of sensors. The sensor system 125, the processor 105, and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include a camera system 127. In one or more arrangements, the camera system 127 can be a part of the sensor system 125. The camera system 127 can include a one or more cameras 128. "Camera" is defined as any device, component, and/or system that can capture visual data. "Visual data" includes video and/or image information/data. The visual data can be in any suitable form.

In one or more arrangements, one or more of the cameras 128 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images.

The one or more cameras 128 can be located in any suitable portion of the vehicle 100. For instance, one or more of the cameras 128 can be located within the vehicle 100. One or more of the cameras 128 can be located on the exterior of the vehicle 100. One or more of the cameras 128 can be located on or exposed to the exterior of the vehicle 100.

The position of one or more of the cameras 128 can be fixed such that its position does not change relative to the vehicle 100. One or more of the cameras 128 can be movable so that its position can change to allow visual data from different portions of the driving environment of the vehicle 100 to be captured. The one or more cameras 128 and/or the movements of the one or more cameras 128 can be controlled by the camera system 127, the sensor system 125, the processor 110 and/or any one or more of the modules 120, 121, 122.

The vehicle 100 can include an input system 130 for receiving input from a vehicle occupant (e.g. a driver or a passenger). Any suitable input system 130 can be used, including, for example, a keypad, display, touch screen, multi-touch screen, button, joystick, mouse, trackball, microphone and/or combinations thereof. A driver of the vehicle 100 can provide one or more manual control inputs through one or more portions of the input system 130 to influence the operation of one or more vehicle systems 145. For instance, the input system 130 can include a brake pedal to allow a driver influence the braking system 155 of the vehicle 100 and/or a gas pedal to allow a driver to influence the throttle system 165 of the vehicle 100. The input system 130 can include a steering wheel to allow a driver to influence the steering system 160 of the vehicle 100.

The vehicle 100 can include an output system 135 for presenting information to the driver or passenger. The output system 135 can include a display, as described above. Alternatively or in addition, the output system 135 may include a microphone, earphone and/or speaker. Some components of the vehicle 100 may serve as both a component of the input system 130 and a component of the output system 135. Also, some of the components of the vehicle 100 may serve as both a component of the input system 130 and a vehicle system 145 (e.g. a brake pedal may be considered to be part of the input system 130 and the braking system 155).

As noted above, the vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current. The vehicle 100 can include a brake pedal (not shown) or other user interface element operatively connected to the braking system 155. Thus, by applying pressure to or otherwise engaging the brake pedal, a manual control input to the braking system 155 and/or the vehicle control system 140 can be received.

Further, the vehicle 100 can include a steering system 160. The steering system 160 can include one or more mechanisms, devices, elements, components, systems, and/or combinations thereof, now known or later developed, configured to adjust the heading of the vehicle 100. The vehicle 100 can include a steering wheel (not shown) or other user interface element operatively connected to the steering system 160. Thus, by turning or otherwise engaging the steering wheel, a manual control input to the steering system 160 and/or the vehicle control system 140 can be received.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100. The vehicle 100 can include a gas pedal (not shown) or other user interface element operatively connected to the throttle system 165. Thus, by applying pressure to or otherwise engaging the gas pedal, a manual control input to the throttle system 165 and/or the vehicle control system 140 can be received.

The vehicle 100 can include a transmission system 170. The transmission system 170 can include one or more mechanisms, devices, elements, components, systems, and/or combinations thereof, now known or later developed, configured to transmit mechanical power from the engine/ motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110, the autonomous driving module 120, the driving environment module 121, the driving error module 119, the collision determination module 123, the traffic rules modules 124, and/or the control weighting module 122 can be operatively connected to communicate with the various vehicle systems 145 and/or individual components thereof. For example, returning to FIG. 1, the processor 110 and/or the autonomous driving module 120 can be in communication to send information to and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous. The processor 110, the autonomous driving module 120, the driving environment module 121, the driving error module 119, the collision determination module 123, the traffic rules modules 124, and/or the control weighting module 122 can be in communication to send information to and/or receive information from the vehicle control system 140, which in turn, can control one or more of the various vehicle systems 145 to control the movement, speed, maneuvering, heading, direction, etc. of vehicle 100

The processor 110 and/or the autonomous driving module 120 may be operable to control the navigation, movement and/or maneuvering of the vehicle 100 by controlling one or more of the vehicle systems 145, one or more components thereof and/or the vehicle control system 140. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

In some arrangements, the processor 110 and/or the autonomous driving module 120 can be configured to determine one or more driving maneuvers to implement relative to one or more detected objects in the driving environment. In some instances, the determined driving maneuver can include one or more aggressive driving maneuvers. "Aggressive driving maneuver" means a driving maneuver that includes a rapid change in vehicle movement, direction, and/or speed to avoid collision with an object. Examples of aggressive driving maneuvers can include quickly changing travel lanes, driving between two travel lanes, driving on a shoulder of a road, a sharp reduction in speed, a sharp increase in speed, hard braking, a sharp deceleration, and/or sharp acceleration, just to name a few possibilities.

An aggressive driving maneuver can include driving maneuvers that may safely violate a traffic rule. Examples of violating a traffic rule include driving at least partially on a shoulder of a road, exceeding the speed limit, driving at least partially on an emergency lane, passing in a non-passing travel lane, changing lanes without signaling, and/or driving at least partially off the road, just to name a few possibilities. "Safely violate a traffic rule" means that the operation of the vehicle would violate a traffic rule, but it would not result in damage, injury or endangerment of the vehicle, its occupants, or persons or property located in the external environment (e.g. by collision). If at least a portion of the driving maneuver would violate a traffic rule but would also still result in a collision between an object in the external environment and the vehicle, then the driving maneuver would not be considered to safely violate a traffic rule.

In some instances, the determined driving maneuver includes one or more conservative driving maneuvers. "Conservative driving maneuver" means a driving maneuver that gradually attempts to avoid collision with an object while maintaining safe operation of the vehicle. Examples of conservative driving maneuvers can include changing travel lanes, moving in a lateral direction within a current travel lane, a minimal reduction in speed, a minimal increase in speed, a gradual deceleration, and/or a gradual acceleration, just to name a few possibilities. Conservative driving maneuvers avoid drastic changes in the operation of the vehicle 100. Conservative driving maneuvers generally do not violate traffic rules.

In some instances, the driving maneuver can include moving backward substantially in the longitudinal direction 103. More particularly, the driving maneuver can include moving safely backward substantially in the longitudinal direction 103 at least partially within the current travel lane of the vehicle 100. "Safely backward" means that the vehicle can move backward without contacting another object (e.g. another vehicle) located behind the vehicle or elsewhere. Thus, while moving backward, the vehicle 100 can sense a rear environment of the vehicle 100 for the presence of objects (e.g. other vehicles) in the rear environment. For instance, such object may be located behind the vehicle 100 and/or approaching the vehicle 100 from behind.

If no objects are detected in the rear environment or no objects are detected within a predetermined distance from the vehicle 100, then it can be determined that the vehicle 100 can move safely backward. In such case, the vehicle 100 can implement the driving maneuver. If one or more objects are detected in the rear environment of the vehicle 100 and it can be determined whether the space behind the vehicle 100 is sufficient or insufficient. If the space behind the vehicle 100 is sufficient, then the vehicle can implement the driving maneuver. The space behind the vehicle 100 can be determined to be sufficient if it is large enough for the vehicle 100 to move backward without contacting the detected object. The determination of whether the space behind the vehicle 100 is sufficient can be based on one or more factors, including, for example, the distance between the vehicle 100 and the detected object, the current or predicted speed of the object and/or the current or predicted speed of the vehicle 100. If the space behind the vehicle 100 is insufficient, then the vehicle 100 may not implement the driving maneuver or may discontinue the backward movement substantially in the longitudinal direction 103.

One or more of the modules (e.g., the driving error module 119, the driving environment module 121, the autonomous driving module 120, and/or other module) can be configured to affect the control weighting module 122. For instance, when it is determined that the human driver of the vehicle has made a driving error (e.g., by the driving error module 119) and that the current driving environment of the vehicle is a low complexity driving environment (e.g., by the driving environment module 121), the control weighting module 122 can automatically increase the second weight assigned to autonomous control inputs. In some instances, the automatic increase of the second weight can be accompanied by a corresponding decrease in the first weight assigned to manual control inputs. In some instances, the first weight can be automatically decreased to substantially zero or zero. In one or more arrangements, the second weight can be increase to be greater or substantial greater (e.g., at least 1.5 times greater, at least 2 times greater, at least 3 times greater, at least 4 times greater, at least 5 times greater, etc.) than the first weight. In some instances when the first weight is greater than the second weight, the first weight and the second weight can be switched so that the second weight is greater than the first weight.

By increasing the second weight, the vehicle can attempt to correct the driving error committed by the human driver by increasing the influence of autonomous control inputs while decreasing or temporarily eliminating the influence of manual control inputs. Thus, when an autonomous control input is received from the vehicle 100, the autonomous control input can be implemented on one or more vehicle systems 145. The autonomous control input can be implemented to cause one or more vehicle systems to be influenced by the autonomous control input commensurate with the second weight. Similarly, if a manual control input is received from the human driver, the manual control input can be implemented to cause one or more vehicle systems to be influenced by the manual control input commensurate with the first weight.

The driving error module 119 can continue to determine whether a driving error is being committed. If it is determined that the driving error has been corrected, then the second weight assigned to autonomous control inputs can be automatically decrease and/or the first weight assigned to manual control inputs can be automatically increased. In some instances, the first weight and/or the second weight can be restored to their respective values prior to their increase or decrease.

Now that the various potential systems, devices, elements and/or components of the vehicle 100 have been described, various methods will now be described. Referring now to FIG. 2, an example of a method of mixed autonomous and manual control of a vehicle is shown. The vehicle can include a shared operational mode in which an autonomous operation of a vehicle system is influenced by autonomous control inputs and manual control inputs.

Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, a first weight can be assigned to manual control inputs, and a second weight can be assigned to autonomous control inputs. In one or more arrangements, the assigning can be performed automatically when the vehicle 100 is in a shared mode. The assigning of the first and second weights can be performed by the control weighting module 122 and/or the processor 110. The assignment of the first and second weights can be performed in any suitable manner, including with respect to any of the criteria described herein. The method 200 can continue to block 220.

At block 220, the weighted manual control input and the weighted autonomous control input can be applied to one or more portions of the vehicle control system 140. The applying can be performed by the control weighting module 122, the autonomous driving module 120 and/or the processor 110. The applying can be made to the entire vehicle control system 140 or a portion thereof. For instance, the applying can be made with respect to the actuator(s) 141 and/or other portion of the vehicle control system 140 associated with the braking system 155, the steering system 160, the throttle system 165 and/or other vehicle system 145, just to name a few possibilities. The applying can be made with respect to a control direction. For instance, the applying can be done with respect to one or more of the vehicle systems 145 in the longitudinal direction 103 of the vehicle 100 or with respect to a portion of the vehicle control system 140 associated therewith. Alternatively or in addition, the applying can be done with respect to one or more of the vehicle systems 145 in the lateral direction 104 of the vehicle 100 or with respect to a portion of the vehicle control system 140 associated therewith. The applying can be done with respect to one or more other directions of the vehicle 100.

The method can continue to block 230. At block 230, responsive to receiving a manual control input, the autonomous operation of one or more vehicle systems 145 can be influenced by the received manual control input. For instance, the vehicle control system 140 can be activated to cause the autonomous operation of one or more vehicle systems 145 to be influenced by the received manual control input. The amount of influence can correspond to the first weight assigned to manual control inputs. The autonomous operation of the one or more vehicle systems 145 can be influenced without deactivating the autonomous operation of the one or more vehicle systems 145. The method 200 can end, or it can return to block 210.

A non-limiting example of the method 200 will now be described. In this example, the vehicle 100 may be entering a highway. For purposes of this example, at least the throttle system 165 and/or the braking system 155 can be operated in an autonomous mode. While on the on-ramp, a driver may wish to move more quickly or more slowly than the current speed implemented by the autonomous operation of the vehicle 100. The driver can engage the accelerator or the brake, as appropriate, to selectively increase or decrease the speed of the vehicle 100.

Such a manual control input from the driver can be received by or communicated to the vehicle control system 140, which in turn, can control the throttle system 165 or the braking system 155. According to arrangements described herein, the manual control input will not cause the autonomous operation of the vehicle 100 to be disabled or deactivated. Rather, the autonomous operation of the respective vehicle system (e.g. the throttle system 165 or the braking system 155) will be influenced in an amount corresponding to the first weight assigned to the manual control input.

As an example, if the vehicle 100 is being operated autonomously and the vehicle 100 is traveling on the on ramp slower than the driver desires, the driver may wish to increase the speed of the vehicle 100, especially if there are several other vehicles behind the autonomous vehicle 100 that are also attempting to enter the highway. The driver can then depress the gas pedal to increase the speed of the vehicle 100. The manual control input can be received by or sent to the vehicle control system 140. The vehicle control system 140 (e.g. one or more actuator(s) 141) can be operable to cause one or more of the vehicle systems 145 to implement the received manual control input. If the first weight assigned to manual control inputs is 0.4, then the manual control input (i.e. engaging the gas pedal) will be reduced by 40 percent over the amount that such amount of pressure would normally provide during the manual mode of vehicle operation.

Again, the determination and/or assignment of weights can be dependent on the driving environment of the vehicle, driver preference(s), and/or other factor(s). Thus, it will be appreciated that in a different driving environment, the same amount of pressure on the accelerator pedal or brake pedal may cause a more drastic or less drastic change in the autonomous operation of the vehicle 100. The assigned weights can change as the driving environment changes. Thus, if the driving environment of the vehicle 100 is classified as being a low complexity environment, then a first set of weights can be assigned to the manual and autonomous control inputs. However, if the driving environment of the vehicle 100 is later classified as being a high complexity environment, then a second set of weights can be assigned to the manual and autonomous control inputs. The second set of weights is different from the first set of weights.

As another example, difficulties in the driving environment may necessitate some level of manual control by the driver in order to safely complete a driving maneuver. For example, due to sensing/perception limitations, the sensor system 125 may detect only a portion of an object in the projected path of the vehicle 100. As a result, the autonomous driving module 120 may determine that the vehicle 100 can be maneuvered safely around the object. However, in reality, such a determination would be incorrect since part of the detected object has been occluded and is actually blocking the projected path of the vehicle 100. By observing the vehicle motion, the driver may see that the vehicle 100 will approach the object too closely. The driver can submit a manual control input (e.g. rotate the steering wheel) to effect a path correction so that the vehicle 100 safely maneuvers around the object.

Such a manual control input from the driver can be sent to or otherwise communicated to the vehicle control system 140, which, in turn, can control the steering system 160. The autonomous operation of the steering system 160 can be influenced in an amount corresponding to the first weight assigned to manual control inputs. However, the manual control input will not cause the autonomous operation of the vehicle 100 to be disabled or deactivated.

A user may provide an extreme manual control input (e.g. a sharp turning of the steering wheel). In some implementations, an extreme manual control input can completely override the autonomous operation of the vehicle 100. The override can continue until a suitable point in time, such as when the extreme manual control input ceases. Thus, in the above example, a driver may have to turn the steering wheel sharply in order to avoid an object in the projected path of the vehicle 100. Responsive to receiving such an extreme manual control input, the control weighting module can assign a weight of 1 to manual control inputs and 0 to autonomous control inputs. As a result, the vehicle 100 can be operated as if in manual mode. Such weights can continue until the driver releases the steering wheel or the manual control input is reduced to a less than extreme level.

It should be noted that the weights assigned by the weighting control module 122 can change over time based on changing conditions or received inputs. For instance, in some arrangements, one or more of the vehicle systems 145 can operate in an autonomous mode until a manual control input is received. Thus, prior to receiving a manual control input, the control weighting module 122 can assign a first weight to manual control inputs and a second weight to autonomous control inputs. In one or more arrangements, the first weight can be 0, and the second weight can be 1. In such case, the one or more of the vehicle systems 145 would be operated entirely autonomously. In one or more other arrangements, the first weight can be 0.01, 0.02, 0.03, 0.04, 0.05, 0.06, 0.07, 0.08, 0.09 or 0.1, just to name a few possibilities. In such case, the second weight can be 0.99, 0.98, 0.97, 0.96, 0.95, 0.94, 0.93, 0.92, 0.91 or 0.9, respectively.

At times in which only autonomous control inputs are received, the autonomous control inputs can, in one or more arrangements, be applied in an amount corresponding to the second weight assigned to autonomous control inputs. However, in the absence of a manual control input, autonomous control inputs can effectively account for 100 percent of the vehicle control. In one or more other arrangements, at times in which only autonomous control inputs are received, the autonomous control inputs can be applied 100 percent without a reduction in an amount corresponding to the second weight assigned to autonomous control inputs.

When a manual control input is received, the weight assigned to autonomous control inputs can be reduced and the weight assigned to manual control inputs can be increased. Once the manual control input is discontinued (e.g. a driver is no longer engaging a brake pedal, a gas pedal and/or the steering wheel), the weighting control module 122 can automatically increase the weight assigned to autonomous control inputs and decrease the weight assigned to manual control inputs. The weight of autonomous control inputs can be reduced when the driver provides a manual control input. The weight of autonomous control inputs can be increased when the driver is no longer engaging the manual controls of the vehicle 100 (e.g. the brake pedal, the gas pedal, the steering wheel, etc.).

In one or more arrangements, the weights determined and/or assigned by the control weighting module 122 can be applied to all vehicle systems 145. In one or more arrangements, the weights determined and/or assigned by the control weighting module 122 can be applied to all vehicle systems 145 in which a driver can manually affect the movement and/or maneuvering of the vehicle.

As noted above, the weights assigned to the manual control inputs and the autonomous control inputs can be applied to a control direction or to one or more vehicle systems 145 associated with a control direction. For instance, the weights determined and/or assigned by the control weighting module 122 can be applied to the longitudinal direction 103 of the vehicle. In such case, the weights can be applied to all vehicle systems 145 that affect movement and/or maneuvering of the vehicle in the longitudinal direction or some subset thereof. For instance, the weights determined and/or assigned by the control weighting module 122 can be applied to the braking system 155 and/or the throttle system 165. In some instances, different weights can be applied to different systems associated with the longitudinal direction 103. For example, a first set of weights can be assigned to the braking system 155, and a second set of weights can be assigned to the throttle system 165.

Alternatively or in addition, the control weighting module 122 can determine and/or assign weights for application to the lateral direction 104 of the vehicle 100. In such case, the weights can be applied to all vehicle systems 145 that affect movement and/or maneuvering of the vehicle 100 in the lateral direction or some subset thereof. For instance, the weights determined and/or assigned by the control weighting module 122 can be applied to the steering system 160. In some instances, different weights can be applied to different systems associated with the lateral direction 104.

In one or more arrangements, the weights assigned to the longitudinal direction 103 can be the same as the weights assigned to the lateral direction 104. Alternatively, the weights assigned to the longitudinal direction 103 can be different from the weights assigned to the lateral direction 104.

Referring now to FIG. 3, another example of a method of mixed autonomous and manual control of a vehicle is shown. The vehicle can include an operational mode in which a vehicle system is influenced by autonomous control inputs and manual control inputs. A first weight can be assigned to manual control inputs, and a second weight can be assigned to autonomous control inputs. The assigning of the first and second weights can be performed by the control weighting module 122 and/or the processor 110. The method 300 can be performed while the vehicle is being operated primarily by manual inputs from a human driver.

Various possible steps of method 300 will now be described. The method 300 illustrated in FIG. 3 may be applicable to the embodiments described above in relation to FIG. 1, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, it can be determined whether the human driver of the vehicle has made a driving error. Such a determination can be made by, for example, the driving error module 119 and/or the processor 110. The determination can be made continuously, periodically, irregularly, randomly, responsive to a request, and/or upon the occurrence of an event or condition. The method can continue to block 320.

At block 320, it can be determined whether a current driving environment of the vehicle is a low complexity driving environment. Such a determination can be made by, for example, the driving environment module 121 and/or the processor 110. The determination can be made continuously, periodically, irregularly, randomly, responsive to a request, and/or upon the occurrence of an event or condition. The determination in block 310 and the determination in block 320 can be made substantially simultaneously or in any order. The method 300 can continue to block 330.

At block 330, in response to determining that the human driver of the vehicle has made the driving error and to determining that the current driving environment of the vehicle is a low complexity driving environment, the second weight assigned to autonomous control inputs can be automatically increased. As a result, the degree of influence that autonomous control inputs will have on the vehicle system will be increased. The increasing of the second weight can be performed by the control weighting module 122 and/or the processor 110. In some instances, an increase in the second weight can cause a corresponding decrease in weight of the first weight. In some instances, particularly when the first weight is greater than the second weight, the first weight and the second weight can be swapped, thereby resulting in an increase in the second weight. The method 300 can continue to block 340.

At block 340, responsive to receiving an autonomous control input, the vehicle system can be caused to be influenced by an autonomous control input in an amount corresponding to the second weight. For instance, the autonomous driving module 120, the vehicle control system 140, and/or the processor 110 can send one or more autonomous control inputs (e.g., signals) to the vehicle system 145. The vehicle system 145 can be influenced by the received autonomous control input(s) in an amount corresponding to the second weight assigned to autonomous control inputs Likewise, if a manual control input is received from a human driver, the vehicle system 145 can be influenced by the received manual control input(s) in an amount corresponding to the first weight assigned to manual control inputs.

The method 300 can end, or it can return to block 310 or some other block. In some instances, it can be determined whether the driving error has been corrected. Responsive to determining that the driving error has been corrected, the second weight assigned to autonomous control inputs can be automatically decreased. In some instances, it can be determined whether the risk of collision is reduced to a predetermined threshold or confidence level. Responsive to determining that the risk of collision is reduced to a predetermined threshold or confidence level, the second weight assigned to autonomous control inputs can be automatically decreased. In some instances, the second weight can be automatically decreased to the same value as it was before it was increased in block 330.

Figure 4:
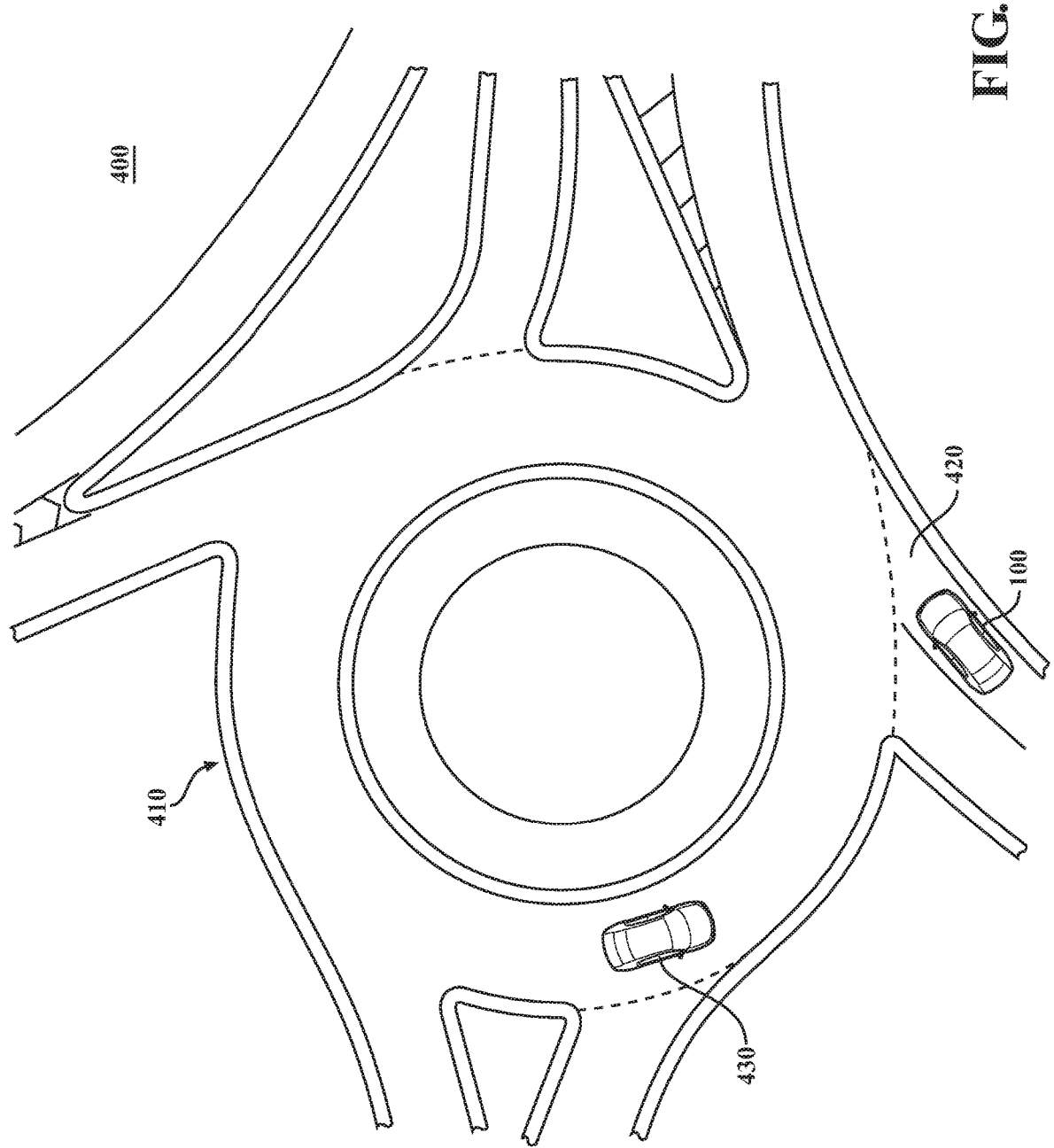
FIG. 4 is an example of a driving scenario in which a vehicle is entering a roundabout.

Various non-limiting examples of the use of arrangements described herein will now be presented. A first example of a driving scenario 400 is shown in FIG. 4. In this example, the vehicle 100 may be entering a roundabout 410. For purposes of this example, the vehicle 100 can be operating in an operational mode in which at least the steering system 160, throttle system 165, and/or the braking system 155 can be influenced by a mix of autonomous control inputs and manual control inputs. A first weight can be assigned to manual control inputs, and a second weight can be assigned to autonomous control inputs. At the present time, the vehicle 100 can be operated primarily or even completely by manual inputs from a human driver. The second weight can be low (e.g., 0.45 or less, 0.4 or less, 0.35 or less, 0.3 or less, 0.25 or less, 0.2 or less, etc.), near zero (e.g., 0.15 or less, 0.1 or less, 0.05 or less, etc.), or the second weight can be zero (i.e., the manual mode).

The vehicle 100 can be approaching the roundabout 410 from a first entrance 420. A second vehicle 430 can already be traveling in the roundabout 410 to the left of the vehicle 100, as is shown in FIG. 4. The vehicle 100 can acquire data about at least a portion of the driving environment, such as by using one or more sensors of the sensor system 125 and/or the camera system 127. Based the on the acquired driving environment data, the vehicle 100 can detect the presence of the second vehicle 430.

Based on the acquired driving environment data, the vehicle 100 can determine that the current driving environment is a low complexity driving environment. In this instance, the determination that the current driving environment is a low complexity driving environment can be based at least in part on only one other object (the second vehicle 430) being detected in the roundabout 410. Alternatively or in addition, the determination can be made based at least in part on whether there is sufficient time for autonomous control inputs be reliably implemented by the vehicle 100, particularly with respect to the second vehicle 430 and/or other objects in the driving environment. Factors that can be used in such a determination can include the location of the second vehicle 430, the speed of the second vehicle 430, and/or the distance between the second vehicle 430 and the vehicle 100.

As the vehicle 100 enters and/or operates within the roundabout 410, the vehicle 100 can acquire vehicle data and/or driving environment data. Using such data, the vehicle can determine whether the human driver of the vehicle has made a driving error. In this particular example, the driver of the vehicle 100 may enter the roundabout 410 too slowly relative for the present driving scenario. Such a delay or hesitation may be due to the driver's inexperience, panic, or uncertainty. As a result of the driver's delay or hesitation, there is an elevated risk of a collision with the second vehicle 430. As a result, the vehicle 100 can determine that a driving error has been committed.

Because the vehicle 100 has determined that the human driver of the vehicle 100 has committed a driving error and that the current driving environment of the vehicle 100 is a low complexity driving environment, the second weight assigned to autonomous control inputs can be automatically increased. In some instances, increasing the second weight assigned to autonomous control inputs can also be accompanied by a corresponding decrease in the first weight assigned to manual control inputs. In some instances, automatically decreasing the first weight assigned to manual control inputs can include automatically decreasing the first weight assigned to manual control inputs to substantially zero.

As a result, automatic control inputs made by the vehicle 100 can be given a greater weight than manual control inputs. Thus, the degree of influence that autonomous control inputs will have on the vehicle system(s) 145 will be increased. The vehicle 100 can provide one or more autonomous control inputs to avoid a collision with the second vehicle 430. In one or more arrangements, the autonomous control input can be for the vehicle 100 to accelerate. In one or more arrangements, the autonomous control input can be for the vehicle 100 to move to the side of the roundabout 410, if possible. In one or more arrangements, the autonomous control input can be for the vehicle 100 to reverse out of the roundabout (e.g., backward into the first entrance 420) if it is safe to do so.

The autonomous control input can be implemented by the relevant one or more vehicle systems 145. As an example, the autonomous driving module 120 can send a command to cause the throttle system 165 to accelerate. As another example, the autonomous driving module 120 can send a command to cause the reverse the vehicle out of the roundabout if it is safe to do so. The vehicle system 145 can be influenced by the received autonomous control input(s) in an amount corresponding to the second weight assigned to autonomous control inputs. Because the second weight has been increased, it will be given a greater amount of credit in terms of its influence on the one or more vehicle systems than it would have previously.

It should be noted that, if one or more manual control inputs are received for a vehicle system 145, the manual control input(s) can be implemented and can influence the vehicle system in an amount corresponding to the first weight. In instances in which the first weight is reduced to zero, the manual control inputs will not have an influence on the vehicle system 145. In instances in which the first weight is near zero, the manual control inputs will have little influence on the vehicle system 145.

In some instances, it can be determined whether the driving error has been corrected. For instance, if the vehicle 100 determines that the vehicle 100 has successfully merged onto the roundabout 410 such that the risk of collision with the second vehicle 430 is below a predetermined threshold or confidence level, then the driving error can be considered to have been corrected. As another example, if the vehicle 100 determines that the vehicle 100 has successfully reversed into the first entrance 420, then the driving error can be considered to have been corrected. If the driving error is determined to have been corrected, the second weight assigned to autonomous control inputs can be automatically decreased. In some instances, the second weight can be automatically decreased to the same value as it was before it was increased.

It should be noted that, while the above example driving scenario is directed to roundabouts, arrangements described herein can be applied to any type of intersection. For example, arrangements described herein can apply to three way intersections (e.g., T junctions, Y junctions, etc.), four way intersections (e.g., a crossing of two roads, which may or may not be perpendicular to each other), five way intersections, 6 way intersections, or other type of intersection.

A second example of a driving scenario 500 is shown in FIGS. 5A-5B, which show an overtaking scenario. For purposes of this example, the vehicle 100 can be operating in an operational mode in which at least the steering system 160, throttle system 165, and/or the braking system 155 can be influenced by a mix of autonomous control inputs and manual control inputs. A first weight can be assigned to manual control inputs, and a second weight can be assigned to autonomous control inputs. At the present time, the vehicle can be operated primarily or even completely by manual inputs from a human driver. The second weight can be low (e.g., 0.45 or less, 0.4 or less, 0.35 or less, 0.3 or less, 0.25 or less, 0.2 or less, etc.), near zero (e.g., 0.15 or less, 0.1 or less, 0.05 or less, etc.), or the second weight can be zero (i.e., the manual mode).

The vehicle 100 can be traveling on a road 505. The road 505 can have two travel lanes, including a first travel lane 510 and a second travel lane 515. Vehicles can move in or can be designated to move in a first direction 511 in the first travel lane 510, and vehicles can move in or can be designated to move in a second direction 516 in the second travel lane 515. The first direction 511 can be opposite to the second direction 516. While FIGS. 5A-5B show an example in which the road 505 includes two travel lanes, it will be understood that arrangements described herein are not limited to roads having two travel lanes.

Referring to FIG. 5A, the vehicle 100 can be traveling in the first travel lane 510. A second vehicle 520 can also be traveling in the first travel lane 510. The second vehicle 520 can be located ahead of the vehicle 100 in the travel direction (the first direction 511) of the first travel lane 510. A third vehicle 530 can be traveling in the second travel lane 515.

The second vehicle 520 may be traveling at a speed that is too slow for the driver of the vehicle 100. Accordingly, the driver of the vehicle 100 may attempt to pass the second vehicle 520 via the second travel lane 515. FIG. 5B shows a subsequent moment in time in which the vehicle 100 has moved into the second travel lane 515. The driver of the vehicle 100 is attempting to pass the second vehicle 520 by overtaking it. Once the second vehicle 520 has been overtaken, the vehicle 100 will return to the first travel lane 510.

The vehicle 100 can acquire data about at least a portion of the driving environment, such as by using one or more sensors of the sensor system 125 and/or the camera system 127. Based the on the acquired driving environment data, the vehicle 100 can detect the presence of one or more objects (e.g., the second vehicle 520 and the third vehicle 530).

Based on the acquired driving environment data, the vehicle 100 can determine that the current driving environment is of sufficiently low complexity. In this instance, the determination can be made based at least in part on the fact that there are only two other vehicles detected and that the road 505 has only two travel lanes 510, 515. Alternatively or in addition, the determination that the current driving environment is of sufficiently low complexity can be made based at least in part on whether there is sufficient time for autonomous control inputs to be reliably implemented by the vehicle 100. Factors that can be used in such a determination can include the location and/or speed of the third vehicle 530, the location and/or speed of the second vehicle 520, the distance between the second vehicle 520 and the vehicle 100, the distance between the third vehicle 530 and the vehicle 100, and/or the availability of open spaces in the first travel lane 510.

The vehicle 100 can acquire vehicle data and/or driving environment data. The vehicle 100 can use such data to determine whether the human driver of the vehicle 100 has made a driving error. In this particular example, the driver of the vehicle 100 may be hesitant in overtaking the second vehicle 520 or may not be overtaking the second vehicle 520 fast enough relative to the oncoming third vehicle 530. As a result, there may be an elevated risk of collision between the vehicle 100 and the third vehicle 530. Thus, the vehicle 100 can determine that a driving error has been committed.

Because the vehicle 100 has been determined that the human driver of the vehicle 100 has committed a driving error and that the current driving environment of the vehicle 100 is of sufficiently low complexity, the second weight assigned to autonomous control inputs can be automatically increased. In some instances, increasing the second weight assigned to autonomous control inputs can also be accompanied by a corresponding decrease in the first weight assigned to manual control inputs. In some instances, automatically decreasing the first weight assigned to manual control inputs can include automatically decreasing the first weight assigned to manual control inputs to substantially zero.

As a result, automatic control inputs made by the vehicle 100 can be given a greater weight than manual control inputs. Thus, the degree of influence that autonomous control inputs will have on the vehicle system will be increased. The vehicle 100 can provide one or more autonomous control inputs to avoid a collision with the third vehicle 530. In one or more arrangements, the autonomous control input can be for the vehicle 100 to brake or otherwise decelerate and merge back into the first travel lane 510 behind the second vehicle 520. In one or more arrangements, the autonomous control input can be for the vehicle 100 to accelerate to overtake the second vehicle 520 and merge back into the first travel lane 510 ahead of the second vehicle 520.

The autonomous control input can be implemented by the relevant one or more vehicle systems 145. For instance, the autonomous driving module 120 can send a command to cause the throttle system 165 to accelerate. In some instances, the autonomous driving module 120 can send a command to the braking system 155 to cause the vehicle 100 to decelerate. The autonomous driving module 120 can send commands to the steering system to steer the vehicle 100 back into the first travel lane 510. The vehicle system 145 can be influenced by the received autonomous control input(s) in an amount corresponding to the second weight assigned to autonomous control inputs. Because the second weight has been increased, it will be given a greater amount of credit in terms of its influence on the one or more vehicle systems than it would have previously.

In some instances, it can be determined whether the driving error has been corrected. For instance, if the vehicle 100 determines that the vehicle 100 has successfully merged back into the first travel lane 510 (either ahead of or behind the second vehicle 520) such that the risk of collision with the third vehicle 530 is below a predetermined threshold or confidence level, then the driving error can be considered to have been corrected. In such case, the second weight assigned to autonomous control inputs can be automatically decreased.

Figure 6A:
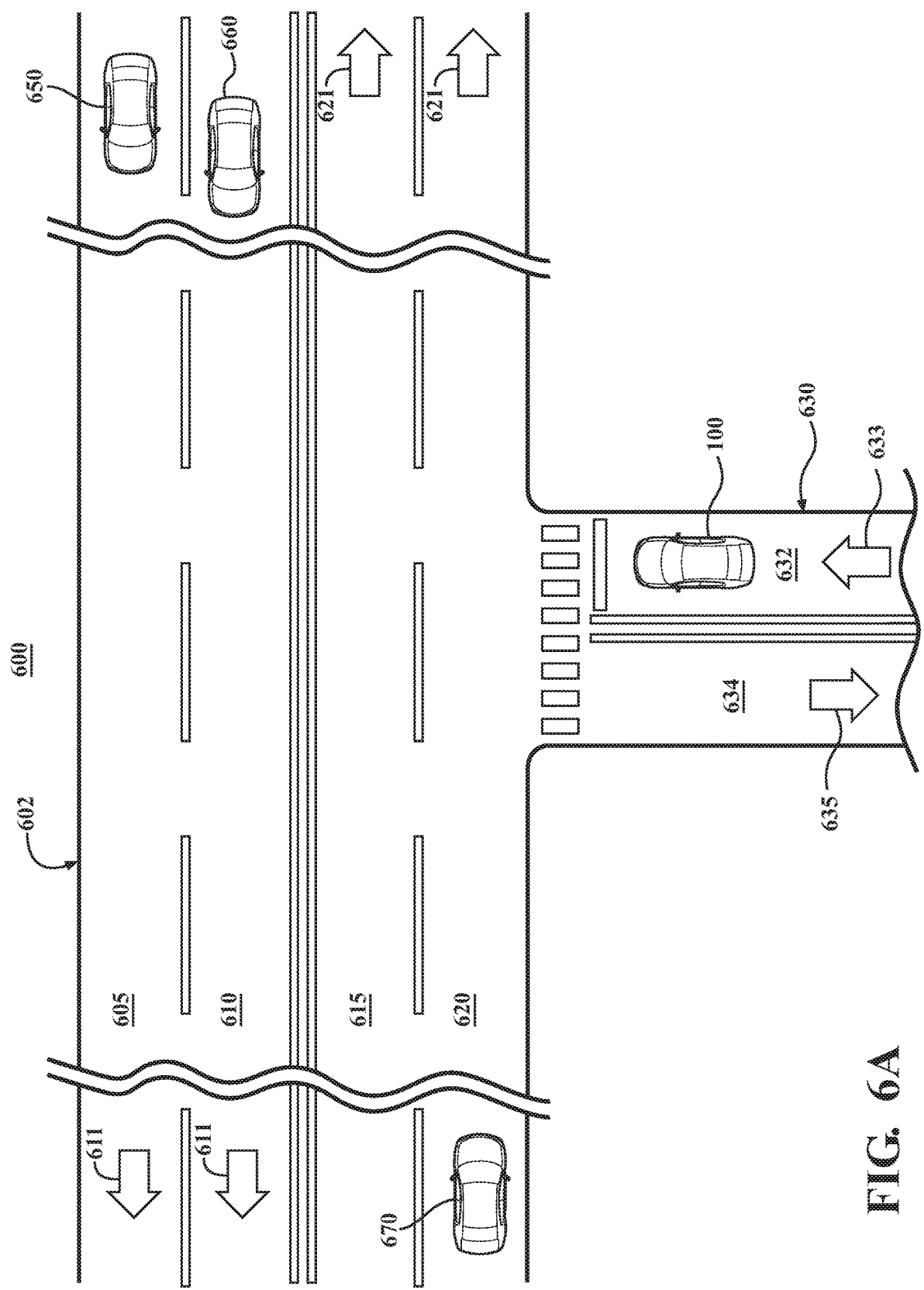
FIGS. 6A-6C present an example of a driving scenario in which the vehicle is making a left turn.
Figure 6B:
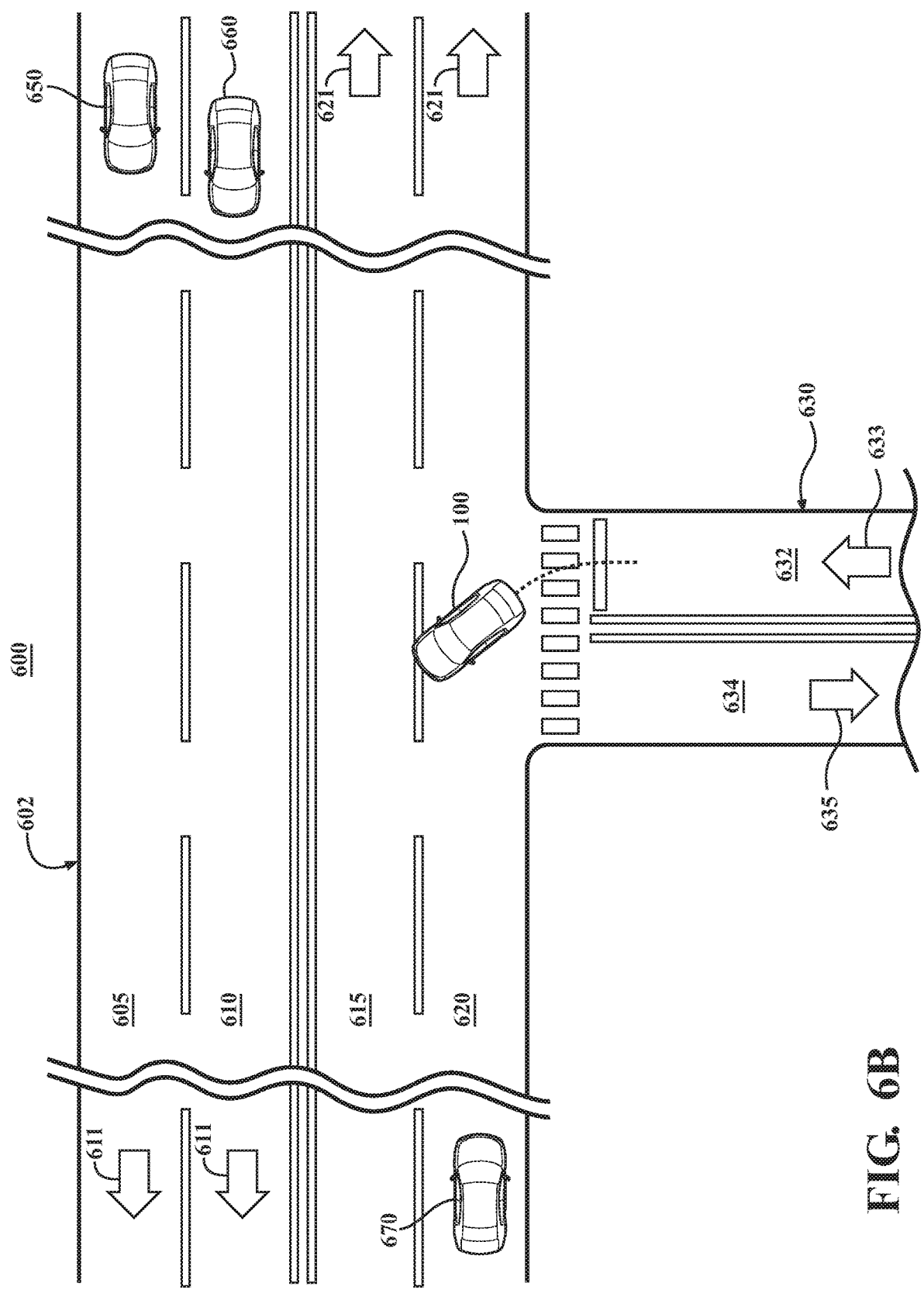
Figure 6C:
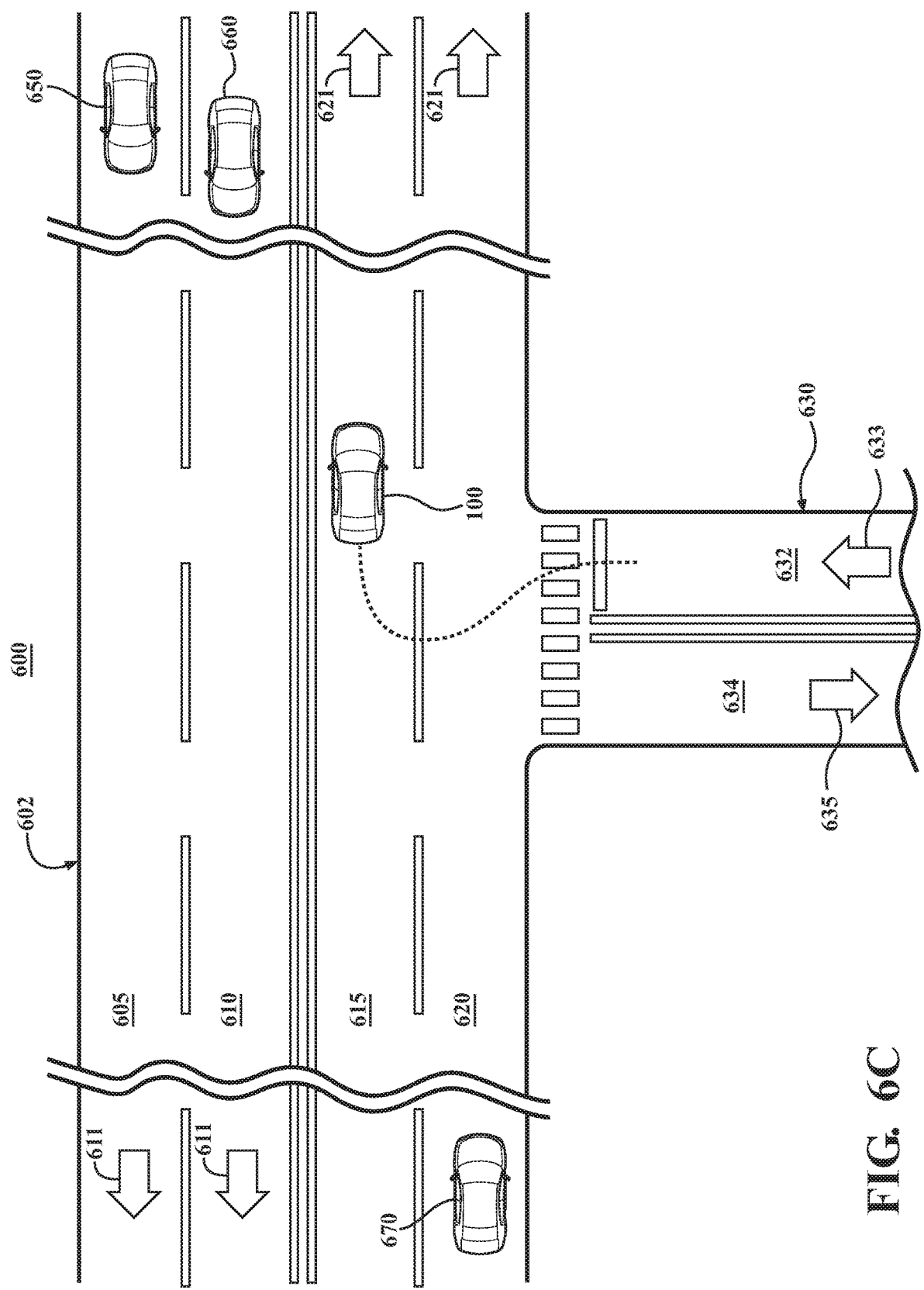

A third example of a driving scenario 600 is shown in FIGS. 6A-6C, which show a left turn scenario at a T intersection. For purposes of this example, the vehicle 100 can be operating in an operational mode in which at least the steering system 160, throttle system 165, and/or the braking system 155 can be influenced by a mix of autonomous control inputs and manual control inputs. A first weight can be assigned to manual control inputs, and a second weight can be assigned to autonomous control inputs. At the present time, the vehicle can be operated primarily or even completely by manual inputs from a human driver. The second weight can be low (e.g., 0.45 or less, 0.4 or less, 0.35 or less, 0.3 or less, 0.25 or less, 0.2 or less, etc.), near zero (e.g., 0.15 or less, 0.1 or less, 0.05 or less, etc.), or the second weight can be zero (i.e., the manual mode).

The vehicle 100 can be traveling on a road 630 that connects to a larger road 602. The road 630 can have two travel lanes, including a first travel lane 632 and a second travel lane 634. Vehicles can move in or can be designated to move in a first direction 633 in the first travel lane 632, and vehicles can move in or can be designated to move in a second direction 635 in the second travel lane 634. The first direction 633 can be opposite to the second direction 635. While this example shows the road 630 as having two travel lanes, it will be understood that arrangements described herein are not limited to roads having two travel lanes. Indeed, the road 630 could have more than two travel lanes. In some instances, the road 630 can have a single travel lane or a plurality of travel lanes configured for one way travel (e.g., vehicles can move in or can be designated to move in the first direction 633).

For purposes of this example, the road 602 can have four travel lanes 605, 610, 615, 620. Vehicles can move in or can be designated to move in direction 621 in travel lanes 615, 620, and vehicles can move in or can be designated to move in direction 611 in travel lanes 605, 610. Direction 621 can be opposite to direction 611. While FIGS. 6A-6C show an example in which the road 602 includes four travel lanes, it will be understood that the road 602 can have any number of travel lanes.

Referring to FIG. 6A, the vehicle 100 can be traveling in the first travel lane 632 of the road 630. The vehicle 100 can come to a stop as it approaches the intersection with road 602. A second vehicle 670 can be traveling in direction 621 in travel lane 620. A third vehicle 650 can be traveling in direction 611 in travel lane 605, and a fourth vehicle can be traveling in direction 611 in travel lane 610. Thus, the second vehicle 670 can be approaching the general location of the vehicle 100 from the left, and the third vehicle 650 and the fourth vehicle 660 can be approaching the general location of the vehicle 100 from the right.

The driver of the vehicle 100 intends to turn left across travel lanes 615, 620 and into one of the travel lanes 605, 610. The vehicle 100 can acquire data about at least a portion of the driving environment, such as by using one or more sensors of the sensor system 125 and/or the camera system 127. Based the on the acquired driving environment data, the vehicle 100 can detect the presence of the second vehicle 670, the third vehicle 650, and the fourth vehicle 660.

Based on the acquired driving environment data, the vehicle 100 can determine that the current driving environment is a low complexity driving environment. In this instance, the determination that the current driving environment is a low complexity driving environment can be based at least in part on there being relatively few other vehicles detected and/or the other vehicles being relatively far away from the vehicle 100. Alternatively or in addition, the determination can be made based at least in part on whether there is sufficient time for autonomous control inputs to be reliably implemented by the vehicle 100, particularly with respect to the other vehicles 650, 660, 670 and/or other objects in the driving environment. Factors that can be used in such a determination can include the location of the other vehicles 650, 660, 670, the speed of the other vehicles 650, 660, 670, and/or the distance between the other vehicles 650, 660, 670 and the vehicle 100.

Referring to FIG. 6B, the vehicle 100 enters the road 605 as the driver has begun to execute a left turn. While doing so, the vehicle 100 can acquire vehicle data and/or driving environment data. Using such data, the vehicle can determine whether the human driver of the vehicle is making or has made a driving error. In this particular example, the driver of the vehicle 100 may be executing the left turn with hesitation or otherwise too slowly relative to one or more of the other vehicles 650, 660, 670. For instance, the second vehicle 670 may not be traveling very fast relative to the vehicle 100 and/or may be located farther away. However, the third vehicle 650 and/or the fourth vehicle 660 can be traveling at a high speed relative to the vehicle 100 and/or can be located closer to the vehicle 100. Coupled with the human driver's delay, there can be an elevated risk of a collision with the third vehicle 650 and/or the fourth vehicle 660. Moreover, the execution of the left turn may become too dangerous because the vehicle 100 is rapidly losing space with respect to the third vehicle 650 and/or the fourth vehicle 660. As a result, the vehicle 100 can determine that a driving error has been committed.

Because the vehicle 100 has determined that the human driver of the vehicle 100 has committed a driving error and that the current driving environment of the vehicle 100 is a low complexity driving environment, the second weight assigned to autonomous control inputs can be automatically increased. In some instances, increasing the second weight assigned to autonomous control inputs can also be accompanied by a corresponding decrease in the first weight assigned to manual control inputs. In some instances, automatically decreasing the first weight assigned to manual control inputs can include automatically decreasing the first weight assigned to manual control inputs to substantially zero.

As a result, automatic control inputs made by the vehicle 100 can be given a greater weight than manual control inputs. Thus, the degree of influence that autonomous control inputs will have on the vehicle system(s) 145 will be increased. The vehicle 100 can provide one or more autonomous control inputs to avoid a collision with the other vehicles 650, 660, 670.

In one or more arrangements, the autonomous control input can be a discontinuation of the original driving maneuver of the human driver and executing a different driving maneuver. For instance, the autonomous control input can be executing a right turn instead of a left turn. More particularly, the autonomous control input can be for the vehicle 100 to execute a right turn into travel lane 615. In at least some instances, such a driving maneuver may be beyond the normal dexterity of a human driver to execute safely under such conditions. Such a driving maneuver may be appropriate in this driving scenario because the second vehicle 670 is farther away from the vehicle 100 than the third vehicle 650 and/or the fourth vehicle 660.

The autonomous control input can be implemented by the relevant one or more vehicle systems 145. As an example, the autonomous driving module 120 can send a command to cause the throttle system 165 to accelerate and for the steering system 160 to turn sharply to the right. The vehicle system 145 can be influenced by the received autonomous control input(s) in an amount corresponding to the second weight assigned to autonomous control inputs. Because the second weight has been increased, it will be given a greater amount of credit in terms of its influence on the one or more vehicle systems than it would have previously. An example of the vehicle 100 implementing the autonomous control input is shown in FIG. 6C.

It should be noted that, if one or more manual control inputs are received for a vehicle system 145, the manual control input(s) can be implemented and can influence the vehicle system in an amount corresponding to the first weight. In instances in which the first weight is reduced to zero, the manual control inputs will not have an influence on the vehicle system 145. In instances in which the first weight is near zero, the manual control inputs will have little influence on the vehicle system 145.

In some instances, it can be determined whether the driving error has been corrected. For instance, if the vehicle 100 determines that the vehicle 100 has successfully turned right into travel lane 615, then the driving error can be considered to have been corrected. If the driving error is determined to have been corrected, the second weight assigned to autonomous control inputs can be automatically decreased. In some instances, the second weight can be automatically decreased to the same value as it was before it was increased. If the driver of the vehicle 100 still wishes to head in direction 611 on road 602, then the driver can determine an appropriate driving maneuver for doing so, such as making a U-turn or making a series of other turns.

It will be appreciated that arrangements described herein can provide numerous benefits, including one or more of the benefits mentioned herein. For example, arrangements described herein can improve the performance of an autonomous vehicle by determining an appropriate balance of manual and autonomous operational modes based on the current driving environment and/or driver preferences. Arrangements described herein can allow for a more harmonized total control of the vehicle by combining the advantages of manual and autonomous operational modes. Arrangements described herein can improve the interaction between a driver and an autonomous vehicle. Arrangements described herein can allow for a vehicle to remain in an autonomous operational mode even when manual control inputs are received from the driver. Arrangements described herein can improve safety for autonomous vehicles. For example, in some instances, the environment may still be of low complexity but perhaps beyond the capability of an average human to react (e.g., due to extreme time pressure), so that the second weight for autonomous control controls can become much larger than the first weight temporarily and automatically. Thus, the vehicle can effectively execute an automatic maneuver in an attempt to correct the error of a human driver.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of mixed autonomous and manual control of a vehicle, the vehicle including an operational mode in which a vehicle system is influenceable by a mix of autonomous control inputs and manual control inputs, a first weight being assigned to manual control inputs and a second weight being assigned to autonomous control inputs, the method being performed while the vehicle is being operated primarily by manual inputs from a human driver, the method comprising:
   determining whether the human driver of the vehicle has made a driving error;
   determining whether a current driving environment of the vehicle is a low complexity driving environment;
   responsive to determining that the human driver of the vehicle has made the driving error and to determining that the current driving environment of the vehicle is a low complexity driving environment, automatically increasing the second weight assigned to autonomous control inputs; and
   responsive to receiving an autonomous control input for the vehicle system, causing the vehicle system to be influenced by the autonomous control input in an amount corresponding to the second weight.

2. The method of claim 1, wherein automatically increasing the second weight assigned to autonomous control inputs includes automatically decreasing the first weight assigned to manual control inputs.

3. The method of claim 2, wherein automatically decreasing the first weight assigned to manual control inputs includes automatically decreasing the first weight assigned to manual control inputs to substantially zero.

4. The method of claim 2, further including:
   responsive to receiving a manual control input for the vehicle system, causing the vehicle system to be influenced by the manual control input in an amount corresponding to the first weight.

5. The method of claim 1, wherein determining whether the human driver of the vehicle has made a driving error includes:
   acquiring sensor data of the current driving environment and of the vehicle;
   comparing the acquired sensor data of the current driving environment and of the vehicle to a driving error library; and
   if the acquired sensor data of the current driving environment and of the vehicle substantially matches a driving error in the driving error library, determining that the human driver of the vehicle has made a driving error.

6. The method of claim 1, further including:
   determining whether the driving error has been corrected; and
   responsive to determining that the driving error has been corrected, automatically decreasing the second weight assigned to autonomous control inputs.

7. The method of claim 1, wherein the first and second weights are applied to the vehicle system in a control direction, wherein the control direction is a longitudinal direction of the vehicle.

8. The method of claim 7, wherein the vehicle system is at least one of a braking system and a throttle system of the vehicle.

9. The method of claim 1, wherein the first and second weights are applied to the vehicle system in a control direction, wherein the control direction is a lateral direction.

10. The method of claim 9, wherein the vehicle system is a steering system of the vehicle.

11. A system for mixed autonomous and manual control of a vehicle, the vehicle including an operational mode in which a vehicle system is influenceable by a mix of autonomous control inputs and manual control inputs, a first weight being assigned to manual control inputs and a second weight being assigned to autonomous control inputs, while the vehicle is being operated primarily by manual inputs from a human driver, the system comprising:
   one or more processors, the one or more processors being programmed to initiate executable operations comprising:
      determining whether the human driver of the vehicle has made a driving error;
      determining whether a current driving environment is a low complexity driving environment;
      responsive to determining that the human driver of the vehicle has made a driving error and to determining that the current driving environment is a low complexity driving environment, automatically increasing the second weight assigned to autonomous control inputs; and
      responsive to receiving an autonomous control input for the vehicle system, causing the vehicle system to be influenced by an autonomous control input in an amount corresponding to the second weight.

12. The system of claim 11, further including:
   a data store operatively connected to the one or more processors, the data store including a driving error library; and a sensor system operatively connected to the one or more processors, the sensor system configured to acquire sensor data of the current driving environment and of the vehicle, wherein determining whether the human driver of the vehicle has made a driving error includes:

comparing acquired sensor data to the driving error library; and if the acquired sensor data substantially matches a driving error in the driving error library, determining that the human driver of the vehicle has made a driving error.

13. The system of claim 11, wherein automatically increasing the second weight assigned to autonomous control inputs includes automatically decreasing the first weight assigned to manual control inputs.

14. The system of claim 13, wherein automatically decreasing the first weight assigned to manual control inputs includes automatically decreasing the first weight assigned to manual control inputs to substantially zero.

15. The system of claim 11, further including:

receiving a manual control input to the vehicle system; and causing the vehicle system to be influenced by the manual control input in an amount corresponding to the first weight.

16. The system of claim 11, wherein the executable operations further include:

determining whether the driving error has been corrected; and responsive to determining that the driving error has been corrected, automatically decreasing the second weight assigned to autonomous control inputs.

17. The system of claim 11, wherein the first and second weights are applied to the vehicle system in a control direction, wherein the control direction is a longitudinal direction of the vehicle.

18. The system of claim 17, wherein the vehicle system is at least one of a braking system and a throttle system.

19. The system of claim 11, wherein the first and second weights are applied to the vehicle system in a control direction, wherein the control direction is a lateral direction of the vehicle.

20. The system of claim 19, wherein the vehicle system is a steering system.

21. A computer program product for mixed autonomous and manual control of a vehicle, the vehicle including an operational mode in which a vehicle system is influenceable by a mix of autonomous control inputs and manual control inputs, a first weight being assigned to manual control inputs and a second weight being assigned to autonomous control inputs, the computer program product comprising a non-transitory computer readable storage medium having program code embodied therewith, the program code executable by a processor to perform a method while the vehicle is being operated primarily by manual inputs from a human driver, the method comprising:

determining whether the human driver of the vehicle has made a driving error;

determining whether a current driving environment is a low complexity driving environment;

responsive to determining that the human driver of the vehicle has made the driving error and to determining that the current driving environment is a low complexity driving environment, automatically increasing the second weight assigned to autonomous control inputs; and responsive to receiving an autonomous control input for the vehicle system, causing the vehicle system to be influenced by an autonomous control input in an amount corresponding to the second weight.

* * * * *